(12) United States Patent
Kim et al.

(10) Patent No.: US 12,280,859 B2
(45) Date of Patent: Apr. 22, 2025

(54) APPARATUS AND METHOD FOR A REAL-TIME-MONITORING OF A RISER AND MOORING OF FLOATING PLATFORMS

(71) Applicant: The Texas A&M University System, College Station, TX (US)

(72) Inventors: Moo-Hyun Kim, College Station, TX (US); Hansung Kim, College Station, TX (US); Chungkuk Jin, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 302 days.

(21) Appl. No.: 17/447,501

(22) Filed: Sep. 13, 2021

(65) Prior Publication Data
US 2022/0081080 A1    Mar. 17, 2022

Related U.S. Application Data

(60) Provisional application No. 62/706,827, filed on Sep. 11, 2020.

(51) Int. Cl.
*B63B 79/10* (2020.01)
*B63B 21/26* (2006.01)
*B63B 79/30* (2020.01)
*G01S 19/42* (2010.01)

(52) U.S. Cl.
CPC .......... *B63B 79/10* (2020.01); *B63B 21/26* (2013.01); *B63B 79/30* (2020.01); *G01S 19/42* (2013.01)

(58) Field of Classification Search
CPC combination set(s) only.
See application file for complete search history.

(56) References Cited

U.S. PATENT DOCUMENTS

| | | | |
|---|---|---|---|
| 9,593,568 B1 * | 3/2017 | LeMonds | E21B 47/007 |
| 2006/0065401 A1 * | 3/2006 | Allen | E21B 44/00 |
| | | | 166/345 |
| 2016/0076359 A1 * | 3/2016 | Danisch | E02D 29/10 |
| | | | 33/304 |
| 2018/0163532 A1 * | 6/2018 | Zhang | E21B 47/001 |
| 2020/0123891 A1 * | 4/2020 | Choi | G06F 30/23 |
| 2020/0199996 A1 * | 6/2020 | Lu | E21B 33/038 |
| 2020/0407021 A1 * | 12/2020 | Aubeny | B63B 21/27 |
| 2021/0207471 A1 * | 7/2021 | Cain | E21B 47/001 |

FOREIGN PATENT DOCUMENTS

| | | | |
|---|---|---|---|
| WO | WO-2018222555 A1 * | 12/2018 | E21B 17/01 |
| WO | WO-2019099693 A1 * | 5/2019 | E21B 21/08 |

* cited by examiner

*Primary Examiner* — Lee E Rodak
*Assistant Examiner* — Sangkyung Lee
(74) *Attorney, Agent, or Firm* — Boisbrun Hofman, PLLC

(57) ABSTRACT

An apparatus, method and system for real-time monitoring of underwater risers, cables, and mooring lines based on a Kalman filter. In an embodiment, the system is formed with sensors configured to sense an inclination of a riser segment between riser nodes of the riser between the upper end and the lower end. A data processing system is configured to employ a Kalman filter algorithm to produce real-time estimates of a deformed shape and a stress of the riser segment using the sensed inclination between the riser nodes.

20 Claims, 35 Drawing Sheets

(a) INCLINATION   (b) HEADING

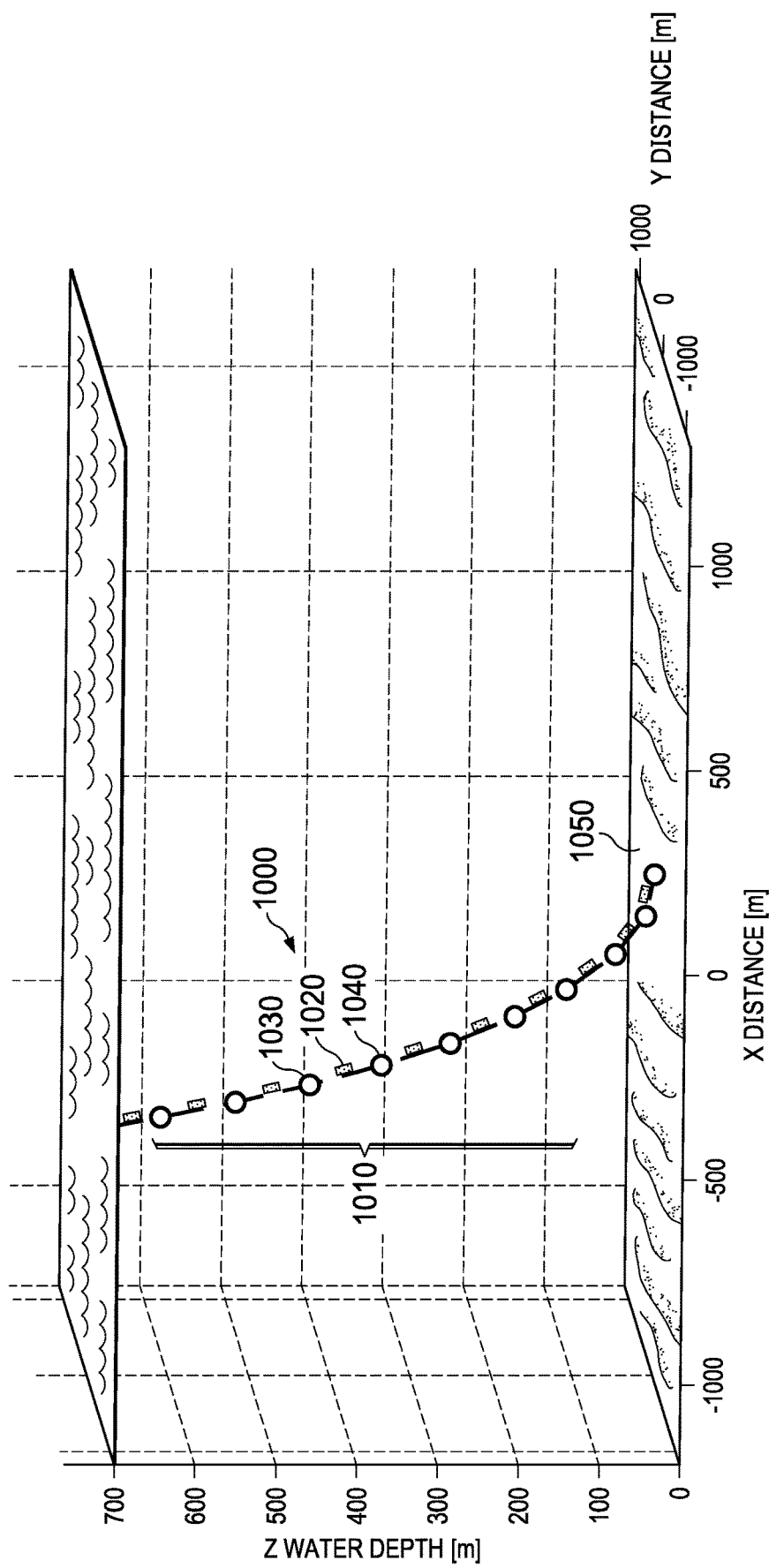

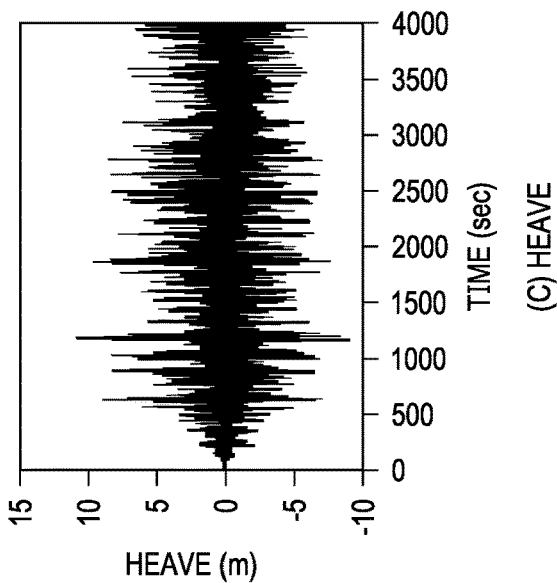
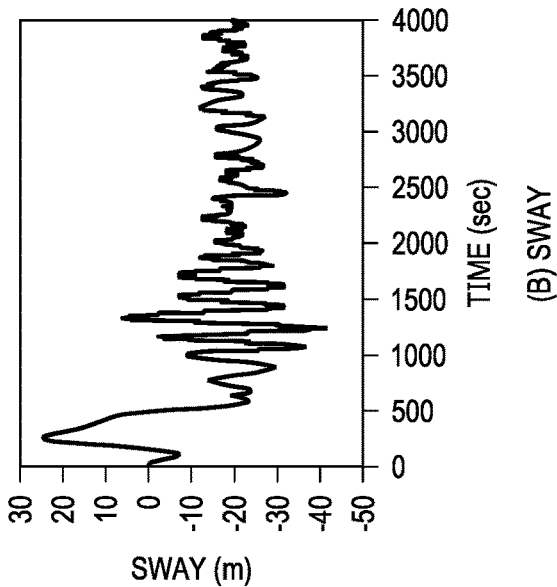
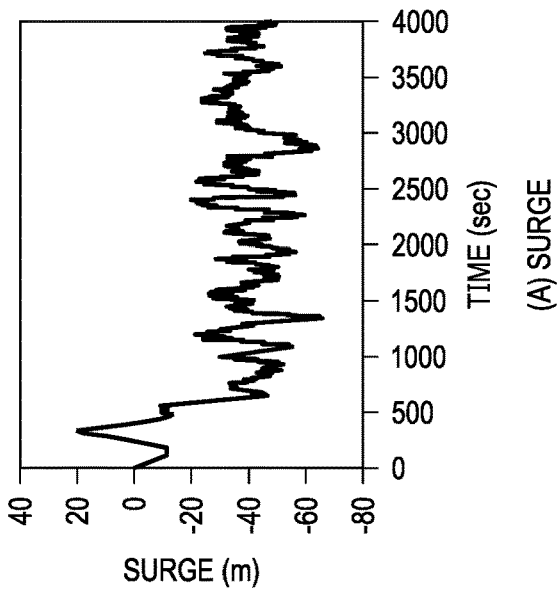
FIGURE 11A
FIGURE 11B
FIGURE 11C

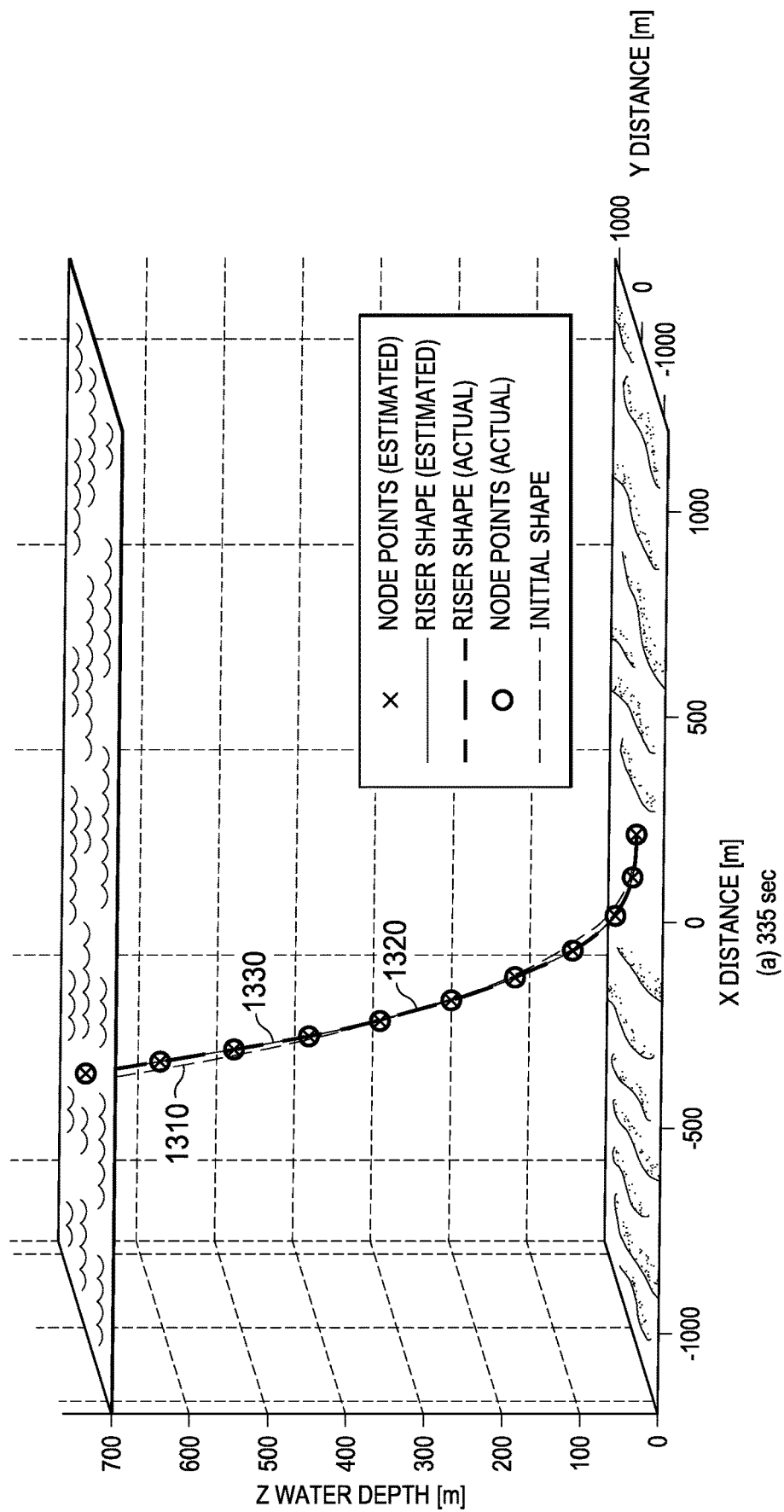

(A) SURGE (X) DIRECTION (C) HEAVE (Z) DIRECTION (B) SWAY DIRECTION (C) HEAVE DIRECTION (C) HEAVE DIRECTION

APPARATUS AND METHOD FOR A REAL-TIME-MONITORING OF A RISER AND MOORING OF FLOATING PLATFORMS

RELATED APPLICATIONS

This application is related to U.S. patent application Ser. No. 16/618,228, entitled "APPARATUS AND METHOD FOR PREDICTING A DEFORMED SHAPE OF A STRUCTURE," filed Nov. 29, 2019, which is incorporated herein by reference.

This application claims the benefit of U.S. Provisional Patent Application No. 62/706,827, entitled "APPARATUS AND METHOD FOR A REAL-TIME MONITORING OF A RISER AND MOORING OF FLOATING PLATFORMS," filed Sep. 11, 2020, which is incorporated herein by reference.

TECHNICAL FIELD

The present disclosure relates to a system for real-time monitoring of a riser and mooring of floating platforms with a small number of sensors, and method of operating and forming the same.

BACKGROUND

Structures such as risers are slender pipes that are used for transporting a natural resource from a seabed and for drilling holes in the seabed to produce oil and gas. One end of a riser is anchored to the seabed, and the other end is attached to a platform that is generally a floating platform. The platform moves continuously due to wind and waves, and the riser is subjected to currents and internal waves. Platform motions and environmental loads are applied to the riser as alternating loads. The recurring loads can cause fatigue failure on the riser and may lead to riser damage. Once the riser is damaged, an operator halts using the line, which is referred to as downtime. Downtime leads to money loss for the operator. If the riser failure causes oil leaks, substantial expense is incurred to restore the natural environment. Therefore, low-cost and reliable monitoring of structural integrity of a riser is necessary for effective operation and would address an important market need.

SUMMARY

These and other problems are generally solved or circumvented, and technical advantages are generally achieved, by advantageous embodiments of the present invention, including a system operable with a riser having an upper end coupled to a platform such as a floating platform and a lower end coupled to a seabed, and method of operating and forming the same. In an embodiment, the system is formed with sensors configured to sense an inclination of a riser segment between riser nodes of the riser between the upper end and the lower end. A data processing system is configured to employ a Kalman filter algorithm to produce real-time estimates of a deformed shape and a stress of the riser segment using the sensed inclination between the riser nodes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which:

FIG. 10 illustrates a graphical representation of an embodiment of a riser with an arrangement of sensors;

FIGS. 11A, 11B and 11C illustrate graphical representations of surge (A), sway (B) and heave (C) motions of the FPSO from the time-domain simulation under the non-collinear environmental condition of Case 4 (see TABLE 7);

FIGS. 13A and 13B illustrate graphical representations of estimated deformed shapes of a riser at 335 seconds under the environmental condition of Case 4 (TABLE 7);

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
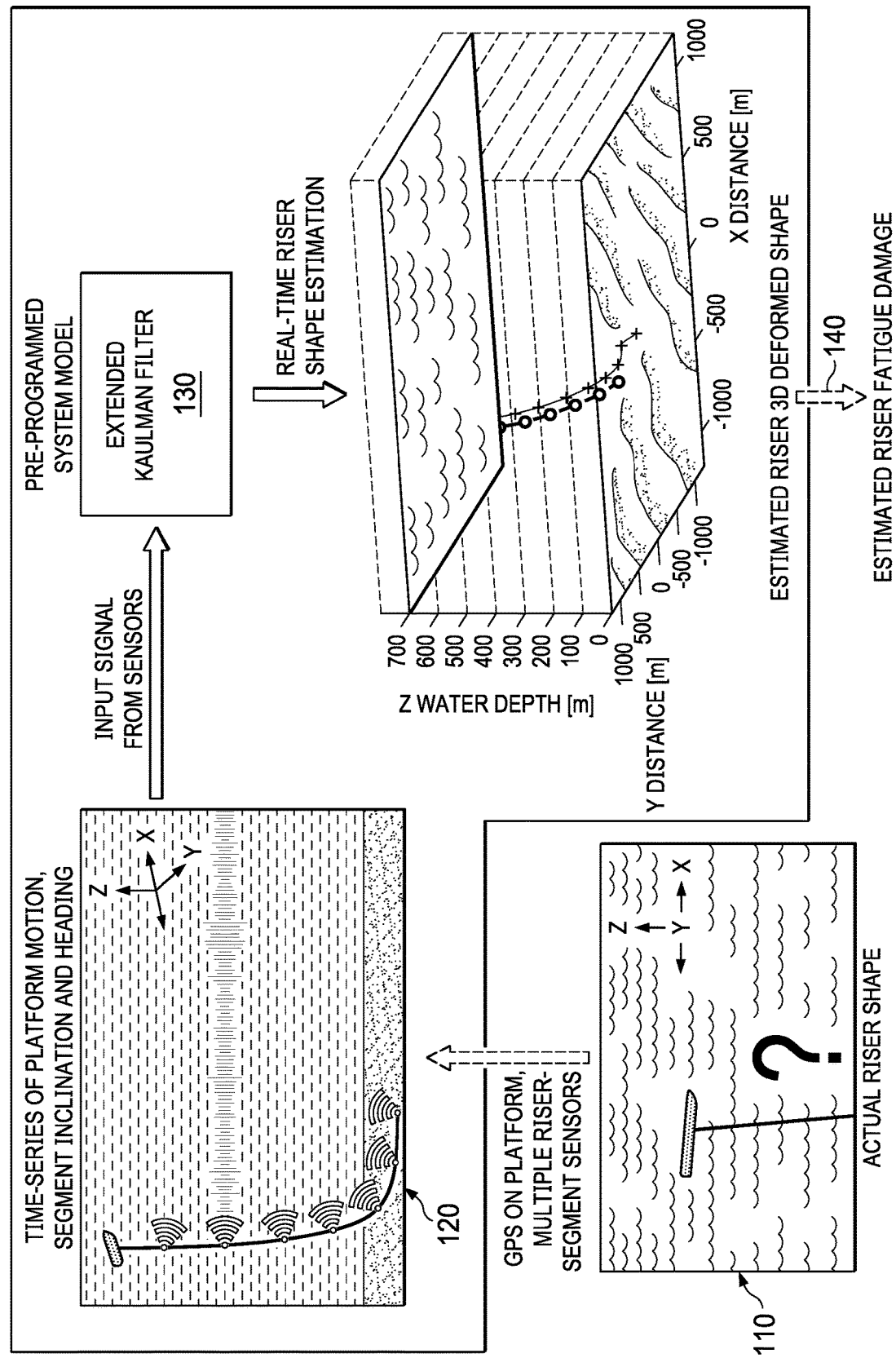
FIG. 1 illustrates a block diagram of an embodiment of a process for real-time riser-shape estimation using an extended Kalman filter ("EKF")

Service-life extension of mooring lines and risers is an important expense issue for many existing floating offshore platforms. The service life of a riser can be extended by verifying and responding to structural integrity issues from a thorough structural inspection. (See, e.g., Keprate A, Ratnayake R, "Fatigue and fracture degradation inspection of offshore structures and mechanical items: the state of the art," ASME 2015 34th International Conference on Ocean Offshore and Arctic Engineering: American Society of Mechanical Engineers Digital Collection; 2015, which is incorporated herein by reference). Service life can also be extended by analyzing and responding to various sensor signals from the monitoring system as introduced herein. Note that all cited references are also incorporated herein by reference.

In deep ocean water, the sensor-based structural monitoring plays a role in detecting a malfunction or initial damage of riser/mooring and preventing subsequent failure. In particular, the real-time monitoring from the deeply-submerged sensors is even more challenging due to the difficulty in transmitting/receiving signals in real time and lack of real-time analyzer algorithms. Mostly in the current state of the art, sensors are powered by a battery, and the retrieved sensor signals by remotely operated vehicle ("ROV") are post-processed by engineers to detect any malfunctions or initial structural problems. In this case, any serious real-time malfunction and structural problem cannot be detected and remedied in a timely manner. Riser safety is particularly important in view of a potential oil spill and risk of hosting units. If oil leakage associated with the damage happens, fatal environmental pollution is inevitable. On the other hand, continuous estimation of riser fatigue is necessary to real-time monitor the accumulated fatigue damage, which is also important for the extension of service life.

A way to monitor the underwater riser and check its structural robustness and fatigue life is to analyze the time-history of elastic responses and stresses. The use of a numerical simulation tool is limited since the real-time measurement of the wind-wave-current of the spot is rarely available or used. (See, e.g., Bitner-Gregersen E M, Eide L I, Hørte T, Skjong R, "Ship and offshore structure design in climate change perspective," Springer; 2013, which is incorporated herein by reference). In this regard, the acquisition and analysis of elastic responses from sensor signals are more practical and beneficial. One of the methods is described in a paper by Choi and Kim in "Development of a New Methodology for Riser Deformed Shape Prediction/Monitoring," ASME 2018 37th International Conference on Ocean, Offshore and ArcticEngineering: American Society of Mechanical Engineers Digital Collection, 2018, which is incorporated herein by reference. The multi-sensor fusion ("MSF") system uses the global positioning system ("GPS") of the platform and multiple inclinometers along the riser. Choi and Kim showed that the use of angle sensors is more effective and robust in tracing riser profile in real time than using accelerometers since dual-time integration is not necessary hence the result is less influenced by sensor noises. The estimation method was for two-dimensional ("2D") plane and based on finite-element ("FE") formulations.

As introduced herein, an extended-Kalman-filter ("EKF")-based real-time riser-monitoring system, is described with the floater-GPS and multiple-inclinometer signals. As a significant extension of Choi and Kim's approach, arbitrarily-shaped risers in the three-dimensional ("3D") space were considered.

Turning now to FIG. 1, illustrated is a block diagram for the overall process 100 of real-time riser-shape estimation using the EKF. To validate the developed theory, first, the platform-mooring riser coupled-dynamics time-domain simulation was performed with a series of bi-axial (inclination and heading) numerical inclinometers along a riser. Second, after sensor noise was artificially added to the acquired signals, the EKF was applied for the real-time estimation of the instantaneous riser profile. Third, the EKF-estimated profile was directly compared with the actual riser profile for all time steps. And last, time-histories of axial and bending stresses were also real-time estimated from the traced riser motions based on author-developed FE formulations so that it can be used for the assessment of fatigue-damage accumulation.

As illustrated in FIG. 1, the EKF algorithm receives input signals from sensors along a riser and provides real-time shape and a three-dimensional (3D) deformed shape of the riser to estimate the riser fatigue damage. An actual riser shape 110 is presented to a real-time riser shape estimation process 120 that produces a time-series for platform motion, segment inclination and heading. Input signals from sensors are employed as input for an extended Kalman filter 130. An estimate 140 of riser fatigue damage is then produced.

Current line-monitoring technology in deep water is based on battery-powered sensors and post-processing of sensor signals, in which real-time monitoring is hard to be achieved. Even when real-time multiple-sensor signals are available, robust algorithms for real-time monitoring of profile, stress, and fatigue are rare. New technologies are presented herein to produce a real-time estimate of a line (or riser) profile and stresses by using multiple inclinometers and a robust Kalman filter algorithm, and a real-time estimate of line profiles and stresses using a small number of inclinometers and a machine-learning algorithm for deep water application. The developed technology is particularly useful for real-time remote monitoring of unmanned platforms, such as employed for floating offshore wind turbines. A machine-learning algorithm can be employed to estimate the variation of mooring top tensions from floater motions.

The apparatus for real-time monitoring of underwater risers, cables, and mooring lines is based on an extended Kalman filter ("EKF"). An upper end of a riser is coupled to a platform and a lower end is coupled to seabed. An overall shape of the riser is estimated using measured signals from multiple bi-axial inclinometers positioned along the riser. A data processing system employs a Kalman filter algorithm such as the EKF algorithm to produce estimates of deformed riser shape and stresses using sensed inclinations and headings of the riser at riser nodes. Corresponding bending and axial stresses along the riser are estimated from the obtained riser shape, which can be used to estimate accumulated riser fatigue and stress damage.

One of the concepts introduced herein is advantageous in that sensor error can be automatically overcome by using an EKF. Real-time monitoring is then possible and practical. The idea can further be extended to include a machine-learning technique employing only a few sensors near a free surface at an offshore platform.

Real-time monitoring of underwater risers, cables, and mooring lines by multiple sensors is in great demand but is still very challenging. A new real-time riser monitoring process and method based on a novel EKF is introduced herein. The overall riser shape is estimated in real-time utilizing measured signals from multiple bi-axial (inclination and heading) inclinometers along the riser. The Kalman algorithm is robust against sensor noise and can successfully reproduce actual riser profiles at each of a plurality of time steps, which has been verified by multiple tests through numerical simulations. For verification, a turret-moored floating production storage and offloading ("FPSO") with a steel catenary riser ("SCR") is employed in four different random waves and currents. Subsequent algorithms are also developed so that the corresponding bending and axial stresses along the riser can also be estimated in real time from the obtained riser shape, which can further be used for the real-time estimation of fatigue-damage accumulation. The digital signal processing may employ an extended Kalman filter with and without machine learning.

Typical methods to monitor a riser's deformed shape are analytical methods, transfer function methods, and mode-matching methods. Analytical methods use accelerometers on the riser and transfer signals into riser curvature with an analytical transfer function. Transfer function and mode-matching methods employ finite-element ("FE") analysis to acquire the transfer function and modal amplitude. Additionally, underwater-camera observation can be used with a remotely operated vehicle ("ROV"), which is temporal and can be limited.

The structural health monitoring of underwater components, such as risers, moorings and power lines, is quite expensive and problematic. To solve this issue, a highly cost-effective, real-time, reduced-sensor monitoring system employing a Kalman-type filter and machine learning techniques is introduced.

Innovative application of the Kalman (e.g., EKF) algorithm is described with real-time inclinometer signals for real-time tracing of risers ("lines"). A Kalman filter is an efficient recursive filter and thus is suitable for real-time estimation. Another advantage of using a Kalman filter is that it is robust in dealing with typical sensor noise. Since the algorithm does not require any time integration of sensor signals, as in the case of using accelerometers, the process is free of unnecessary processing and integration errors. For shallow waters, sensors can be installed along entire lines to get real-time signals from the sensors so that the EKF can principally solely be used for line monitoring.

Real-time estimation of a riser's deformed shape using an EKF algorithm was tested with typical sensor noises. Stress estimation was also conducted after the real-time estimation of riser shape. Results show that the method introduced herein can estimate a riser's deformed shape and stress well in real time.

The EKF is a nonlinear version of a Kalman filter through linearization of a nonlinear function. For this monitoring system, a floater-global positioning system ("GPS") signal and multiple-inclinometer signals along the line are employed. Bi-axial inclinometers are positioned in the middle of the segments. As inclination and heading are measured by the installed sensors along the line, the developed EKF algorithm can estimate the displacements of each node by the given sensor signals at each time step. Connecting the estimated nodes provides an estimated deformed shape of the line. A system model with estimation and sensor errors in the state space is employed to define the relationship between input measurement (i.e., sensor data) and output (line shape). The relationship can be linear or nonlinear. When nonlinear, a Jacobian matrix is needed for an EKF algorithm to convert the nonlinear equation into a corresponding linearized equation. The Kalman filter generates an estimate of the state of the system as an average of the system's predicted state and the new measurement using a Kalman gain, which is a weighted average.

The estimation of a line's deformed shape can contribute to real-time internal stress estimation of the line, i.e., axial and bending stresses. Angles and curvatures can be obtained by calculating angles and curvatures from the monitored profile through spatial derivatives. Stress estimation can be based on a single global coordinate system with the generalized coordinate system. After principal normal vectors (i.e., curvatures) are obtained in a general coordinate system, in-plane and out-of-plane bending moments can be obtained. Also, assuming that top tension can be measured, effective tension along the line can be obtained from tangent vectors (i.e., angles), weight, and buoyancy along the line.

When the water depth is large, getting a real-time signal from the deep portions of inclinometers can be problematic and challenging. In this case, machine learning can be combined with the EKF algorithm with a small number of sensors. For this combined system, there are sensors at the top portion of lines, and the EKF algorithm estimates the line's shape up to the location where sensors are installed. For the remaining part, which does not have sensors, machine learning is used to estimate the remaining line shape. To generate corresponding big data for training of machine learning, a floater-mooring-riser fully-coupled dynamic simulation program can be used.

Concepts introduced herein include a digital-twin technology with a few sensors and machine learning results at a reasonable cost. It is remotely operated, i.e., smart real-time sensor and target signals can be collected and monitored on land. Real-time estimation is produced to estimate accumulated fatigue of any lines. No battery replacement and no human effort is required for post-processing.

Various types of sensors can be used for riser monitoring, such as accelerometer, strain gauge, inclinometer, angular velocity sensors, and curvature sensor, as described in the following references, which are incorporated herein by reference.

Peng R, Zhi Z, "A state-of-the-art review on structural health monitoring of deepwater floatingplatform," Pacific Science Review A: Natural Science and Engineering, 14 (2012) 253-263.

Karayaka M. Tahiti, "Online Monitoring System for Steel Catenary Risers and Flowlines," May4-7, 2009. Offshore Technology Conference, Houston, TX 2009.

Karayaka M, Ruf W, Natarajan S., "Steel catenary riser response characterization with on-line monitoring devices." Proceedings of the 28th International Conference on Ocean, Honolulu, HI, USA2009. p. 687698.

Podskarbi M, Walters D, Hatton S, Karayaka M, "Design consideration of monitoring systemsfor deepwater steel catenary risers (SCRs)," The Seventeenth International Offshore and Polar Engineering Conference: International Society of Offshore and Polar Engineers; 2007.

Podskarbi M, Walters D, "Review and Evaluation of Riser Integrity Monitoring Systems and Data Processing Methods," Deep Offshore Technology, (2006).

Cook H, Dopj era D, Thethi R, Williams L, "Riser integrity management for deepwater developments," Offshore Technology Conference: Offshore Technology Conference; 2006.

Thethi R, Howells H, Natarajan S, Bridge C, "A fatigue monitoring strategy and implementation on a deepwater top tensioned riser," Offshore Technology Conference: Offshore Technology Conference; 2005.

Signals measured by various sensors are used for riser integrity analysis with different analysis methods, as summarized in TABLE 1. (See, e.g., Mercan B, Chandra Y, Maheshwari H, Campbell M, "Comparison of Riser Fatigue Methodologies Based on Measured Motion Data," Offshore Technology Conference: Offshore Technology Conference; 2016, which is incorporated herein by reference.)

TABLE 1

| Parameters | Method Analytical | Transfer Function Method | Mode Matching Method |
|---|---|---|---|
| Riser Response | Wave & VIV | Wave & VIV | VIV |
| FEM required | No | Yes | Yes |
| Accuracy | High (Application Limited) | Moderate | Low |

Each method has unique advantages and disadvantages. While the wave-frequency responses of a riser are mainly induced by wave excitations, current can induce high-frequency VIV responses. Based on the riser type, behavior, and situation, the target analysis method should be determined.

For instance, transfer function and mode matching methods need finite element ("FE") analysis to acquire the transfer function and modal amplitude, and prediction accuracy is diminished for the location far away from the sensor location. The Timoshenko-beam-based analytical method is also applicable for response estimation under wave and VIV excitations. However, the measured acceleration data from sensors are converted into curvature with an analytical transfer function. It is not easy to reflect actual structural properties, such as structural damping and added mass, and the fatigue calculation is only available at the sensor location. Also, the g-contamination includedin the measured acceleration must be eliminated for more accurate monitoring. (See, e.g., Ge M L, Kannala J, Li S, Maheshwari H, Campbell M, "A New Riser Fatigue Monitoring Methodology Based on Measured Accelerations," ASME 2014 33rd International Conference on Ocean, Offshore and Arctic Engineering: American Society of Mechanical Engineers; 2014. p. V06AT04A063-V006AT004A063, which is incorporated herein by reference.) Additionally, this method is vulnerable to the sensor error. On the other hand, the proposed EKF-based monitoring system can generically overcome the sensor error inside of the algorithm.

Figure 2A:
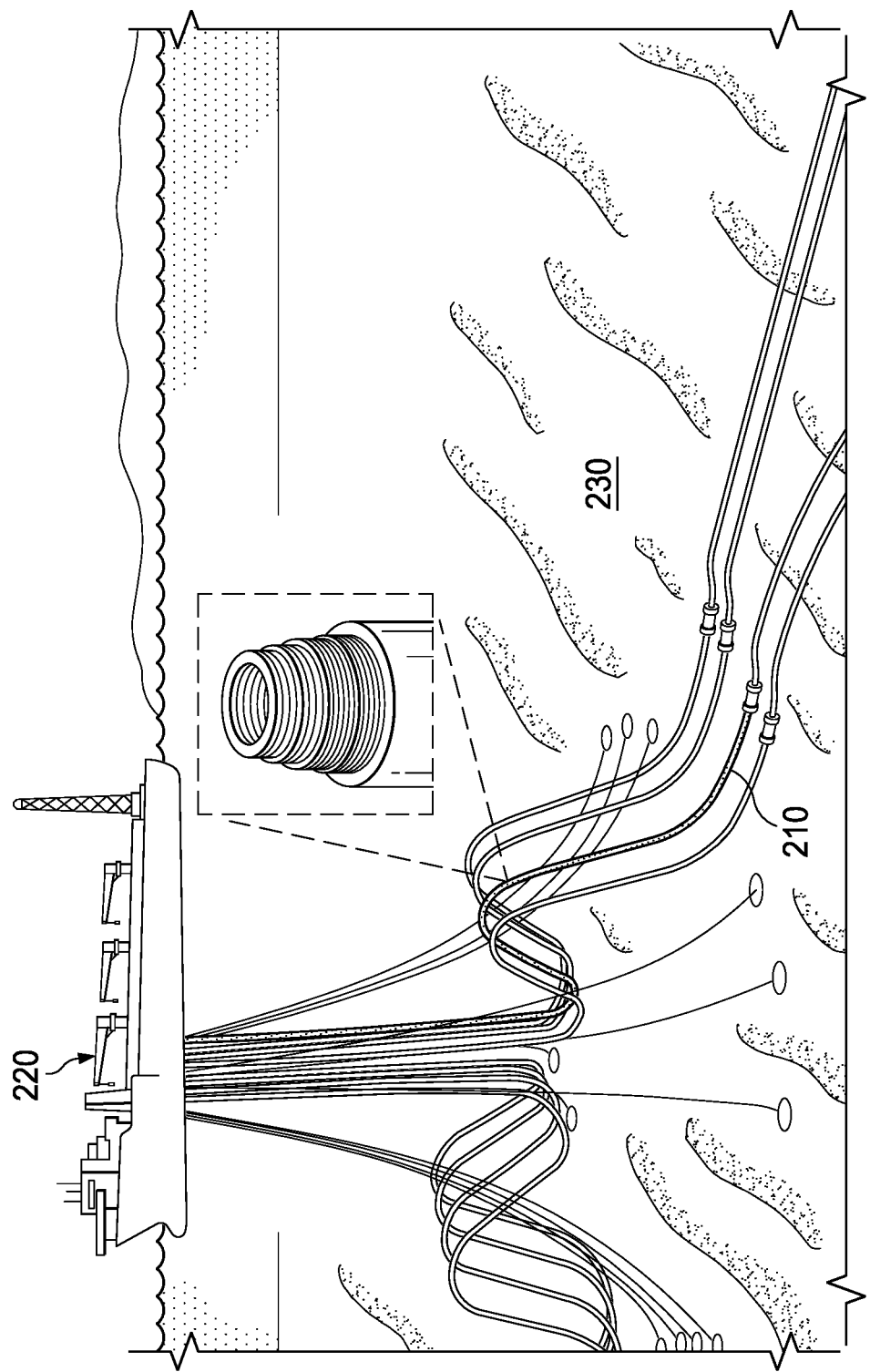
FIGS. 2A and 2B illustrate pictorial diagrams of portions of an embodiment of a riser monitoring system that provides real-time monitoring.
Figure 2B:
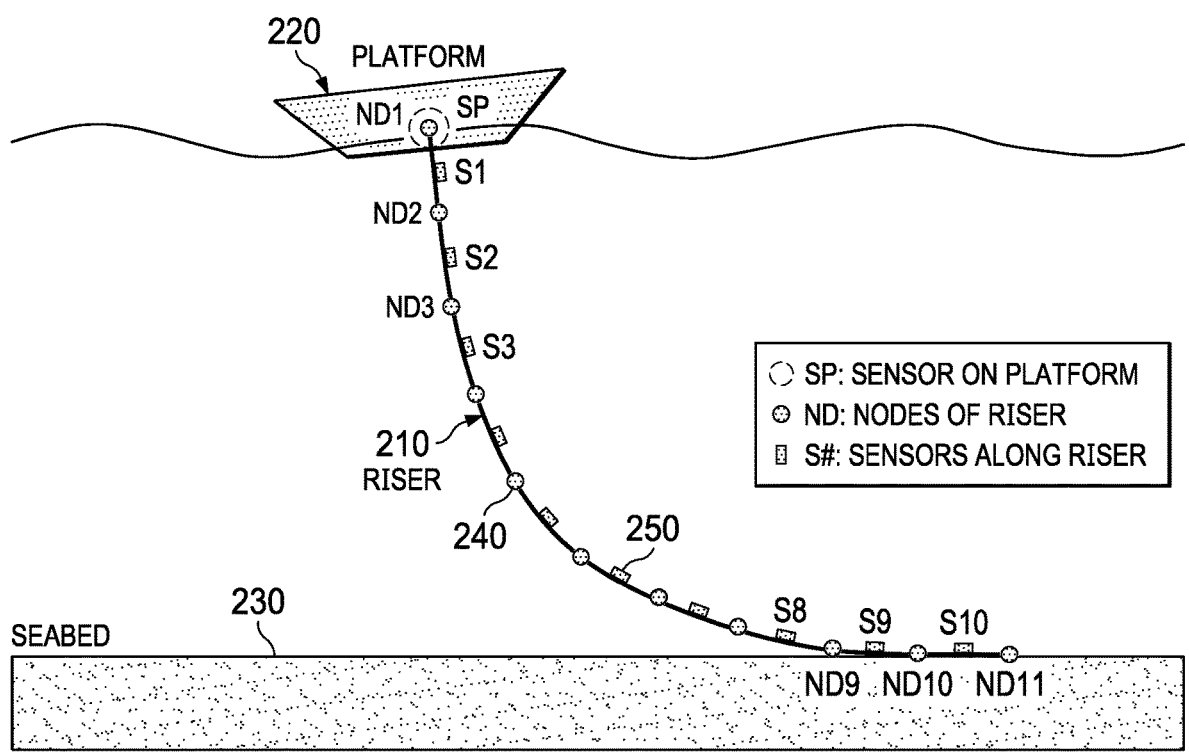

Turning now to FIGS. 2A and 2B, illustrated are pictorial diagrams of portions of an embodiment of a riser monitoring system that provides real-time monitoring. A pipe 210 (a riser or line) connects an offshore floating structure/platform 220 to a sub-sea system coupled to a seabed 230. Accordingly, one end of the riser is anchored to the seabed 230, and the other end is connected to the floating platform 220. One of the nodes 240 of the riser and one of the sensors 250 along the riser are illustrated in FIG. 2B. Above the sea surface, a global navigation satellite system ("GNSS") or platform position monitoring system can be used to monitor the riser-top positions.

One of the key technical challenges for deep-water riser design is fatigue due to currents and motion of the platform. Real-time deformed shape and varying stress lead to riser fatigue. Above the sea surface, the global navigation satellite system ("GNSS") or other platform position monitoring system such as global positioning system ("GPS") can be used to monitor the riser-top positions. A challenge is that such navigation systems do not work underwater, and accelerometer sensors have cumulative error caused by integration.

Underwater, contract type sensors, such as inertial measurement units ("IMUs"), accelerometers, inclinometers, strain gauges, can be placed on the riser. Among them, inclinometers are beneficial, which measure bi-axial (inclination and heading) riser angles. The top and bottom points of the riser are known at each time, as explained in the above. As shown in FIG. 2B, the riser can be divided into n nodes, and n−1 inclinometers are installed at the center of each segment. In the present example, identical sensor intervals were selected for simplicity, although variable sensor intervals can also be used. TABLE 2 summarizes the sensors employable for the EKS system. The sensor signals are assumed to be measured and transmitted to the platform, which allows real-time monitoring through computer embedded algorithms.

TABLE 2

| Sensor Location | Measured Data | Number of Sensors |
|---|---|---|
| At platform (Above water surface) | Top Position (x, y, z) | 1 |
| At the midpoint between nodes along riser (Underwater) | Inclination | n−1 |
| At the midpoint between nodes along riser (Underwater) | Heading | n−1 |

An objective of the processes introduced herein is to produce a real-time estimate the riser's deformed shape from measured sensor signals. Sensors include multiple inclinometers along the riser and GPS for tracing top connection to the platform. Then, real-time estimation of riser's deformed shape from the sensor signals is necessary and the EKF is selected.

Figure 2C:
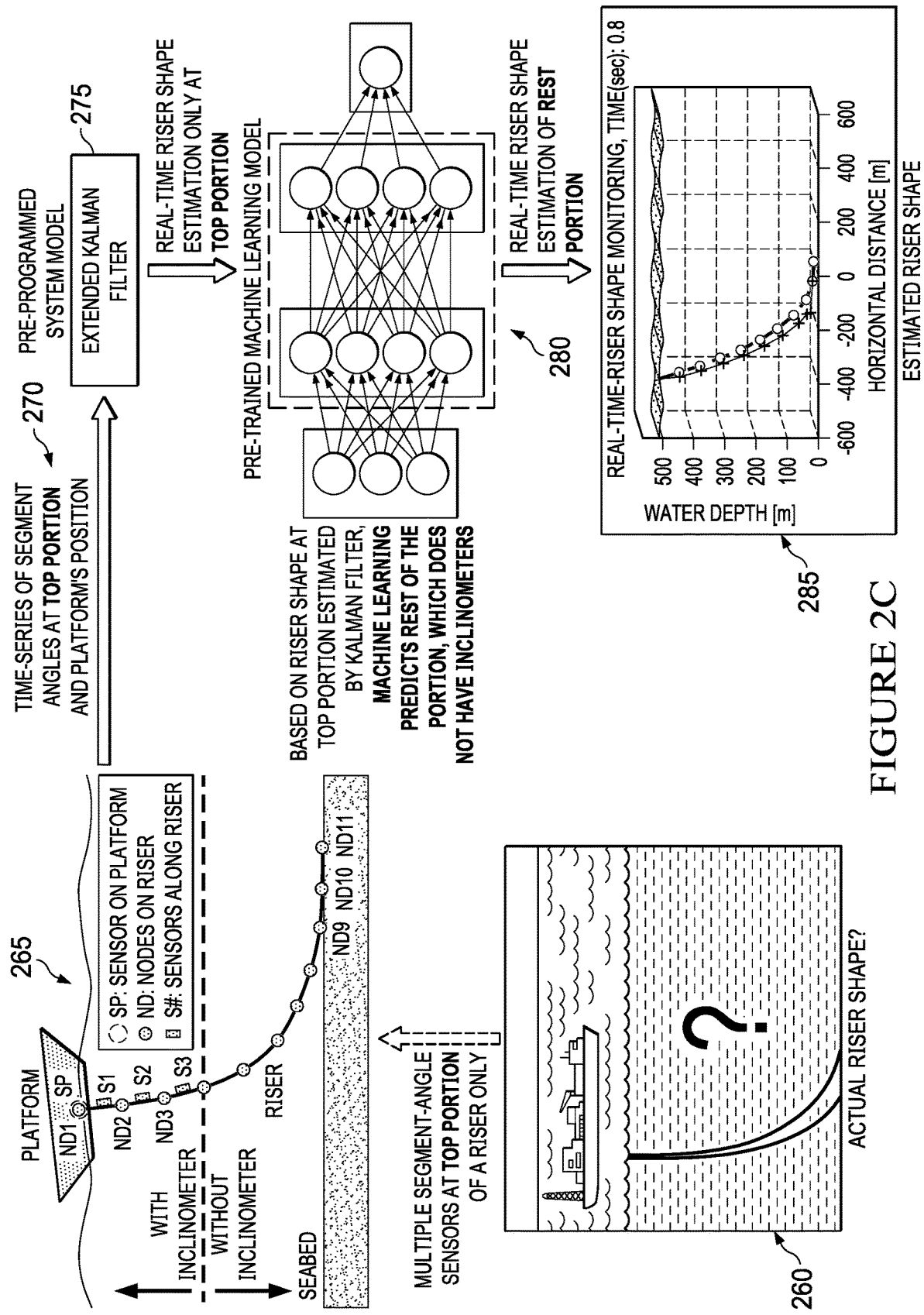
FIG. 2C illustrates a block diagram of an embodiment of a real-time monitoring process that employs an EKF with machine learning for deep-water application.

Turning now to FIG. 2C, illustrated is a block diagram of an embodiment of a real-time monitoring process that employs an EKF with machine learning for deep-water application. With multiple segment-angle sensors at the top portion of the riser, the system uses a time-series of segment angles at the top portion and the platform's position to estimate in real-time the shape of the riser. Only sensors in the top portion of the riser are employed. Real-time riser shape estimation of the remaining portion of the riser is produced using the EKF.

As illustrated in FIG. 2C, an actual riser shape 260 is presented to the riser shape estimation process. Multiple segment-angle sensors 265 are shown positioned at a top portion of the riser. A time series of segment angles 270 at the top portion of the riser and the platform's position are produced and presented to the extended Kalman filter 275, where real-time riser shape estimation is generated at the top portion of the riser. A real-time riser shape estimation 280 for remaining (lower) portions of the riser are estimated. The end result of estimated riser shape 290 is produced.

Figure 3:
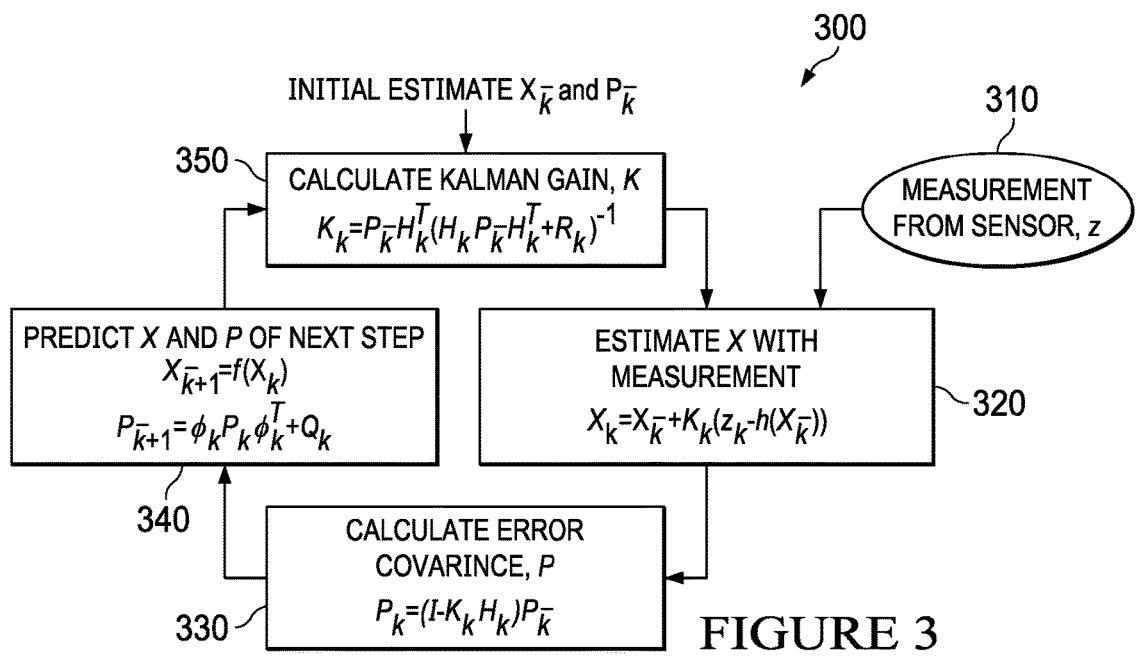
FIG. 3 illustrates a block diagram representation of an embodiment of an extended Kalman filter estimation loop.

Turning now to FIG. 3, illustrated is a block-diagram representation of an embodiment of an extended Kalman filter estimation loop 300. The Kalman parameter H' (described herein below) should be in matrix form for computation with covariances. The resulting observation model is nonlinear.

The Kalman filter keeps reducing the prediction error of the riser state X through a recursively-calculating process. The superscript "-" means the predicted value for the next time step. Otherwise, it means the calculated (or estimated) value from a measurement at the current time step.

A state measurement z is initially obtained from a sensor as illustrated in a step or module 310. The measurement is presented to a step or module 320 that estimates the riser state X. An error covariance matrix P is then calculated in a step or module 330. In a step or module 340, the riser state X and the error covariance matrix P are predicted. In a step or module 350, the Kalman gain K is calculated. To initiate the process, an initial estimate of the riser state X and the error covariance matrix P are provided to the step or module 350 where the Kalman gain is calculated.

The EKF was selected to define the relationship between input signals and a riser's deformed shape. A Kalman filter algorithm estimates state based on the statistical properties of a measurement. It is a very practical algorithm, commonly used for guidance-navigation control of vehicles and inverse wave spectrum from estimation. (See, e.g., Kim H, Kang H, Kim M-H, "Real-Time Inverse Estimation of Ocean Wave Spectra from Vessel-Motion Sensors Using Adaptive Kalman Filter," Applied Sciences, 9 (2019) 2797, which is incorporated herein by reference.) The EKF is the nonlinear version of the Kalman filter through linearization of the nonlinear function. Kalman filtering is applied to the system model of Equations (1) and (2) in the space state space as:

$$X_{k+1}=f(X_k)+w_k \quad \text{Equation (1)}$$

$$z_k=h(X_k)+v_k \quad \text{Equation (2)}$$

where
$X_k$=process state vector
f=nonlinear equation for state vector
$w_k$=model error vector
$z_k$=measurement vector
h=nonlinear equation for measurement vector
$v_k$=sensor error vector It is assumed that there exists a model error w in the state X and a sensor error v in the measurement z during the transition to the next time step. Note that in the riser monitoring system, the process state vector X consists of the x and y coordinates of the nodes. The covariances for the two errors are given by:

$$Q=E[w_k w_k^T] \quad \text{Equation 3}$$

$$R=E[v_k v_k^T] \quad \text{Equation 4}$$

where
$X_k^-$=predicted state vector
$X_k$=estimated state vector $P_k^-$=predicted error covariance matrix
$P_k$=estimated error covariance matrix
$\phi_k$=state transition matrix
$K_k$=Kalman gain
$H_k$=output matrix
$Q_k$=model error covariance matrix
$R_k$=measurement (sensor) error covariance matrix As illustrated in FIG. 3, the Kalman gain, process state, and error covariance can be calculated as:

$$K_k=P_k^- H_k^T(H_k P_k^- H_k^T+R_k)^{-1} \quad (1)$$

$$X_k=X_k^-+K_k(z_k-h(X_k^-)) \quad (2)$$

$$P_k=(I-K_k H_k)P_k^- \quad (3)$$

$$X_{k+1}^-=f(X_k) \quad (4)$$

$$P_{k+1}^-=\phi_k P_k \phi_k^T+Q_k \quad (9)$$

The initial state $X_I$ is to be estimated, and the initial error covariance $P_I$ should be determined by the designer. The determination of the initial state $X_I$ is discussed below. If an initial state P ($P_I$) is too small, it will result in small Kalman gain K, as given in Equation 5 at the beginning of the calculation.

Small Kalman gain K means giving more weight to sensor measurement and prediction. Subsequently, at the beginning of the filtering, the measurement is relatively neglected, and the prediction is overly counted. In other words, the covariance matrix $P_I$ determines the initial conversions rate of the state vector X. Small P delays the initial conversions rate. Therefore when the designer does not have prior knowledge of the state X, reasonably large initial error covariance $P_I$ should be set. (See, e.g., Simon D, "Using nonlinear Kalman filtering to estimate signals." Embedded Systems Design, 19 (2006) 38, which is incorporated herein by reference.) Therefore, sufficiently large initial error covariance $P_I$ was set, as given in Equation 10. The notation 'diag' means taking the diagonal from a matrix into a vector form and vice-versa.

$$P_I = \text{diag} \begin{pmatrix} 100_1 \\ 100_2 \\ \vdots \\ 100_{i-1} \\ 100_i \end{pmatrix} \quad (5)$$

where i=length of X.

The parameter R is the measurement error covariance, which is generally determined from the error performance of the given sensor. An adaptive R may be applied when a sensor error is not statistically constant in the actual filtering process. In the estimation step, optimum X is calculated by using the weight factor K, as given in Equation 6.

In Equations 5 and 7, the H matrix is used instead of the nonlinear function h of input X and output z. The matrix H is used to approximate the system by linearizing the h function of z=h(X). If the output for a particular input $x_1$ is $z_1$, the approximated $z_2$ for input $x_2$ can be calculated by using the derivative of h at a point $x_1$. This feature is called Jacobian, and the matrix of the first-order derivatives of the function h for all inputs is referred to as the Jacobian matrix $J_h$. Then a linear transformation represented by the matrix H is the best linear approximation of h near the point x. In summary, as a function h is defined as z=h(x), the $J_h$ (here defined as H), i.e., the Jacobian matrix of h, consists of the first derivatives of h and can linearize the model as $z \approx J_h \cdot X = H \cdot X$. More details about H are discussed further hereinbelow. Likewise, in Equation 9, the Jacobian matrix $\phi_k$ is used to linearize the function f. In the riser monitoring system, $\phi_k$ is an identity matrix. The extended Kalman filter is characterized by using h and the function f in Equations 6 and 8, respectively.

In the prediction step, P is increased by model error covariance Q. The covariance Q is a design parameter that can be adjusted by the designer. This process is repeated.

The conventional Kalman filter is not directly suitable for practical applications. Therefore, research related to using Kalman filter focuses mainly on the design of an adaptive type to fit a specific model including the optimization of the design factors R and Q. The optimized R and Q lead to improvement of the estimation performance of the filter. However, the option chosen here is to use fixed R and Q because the main purpose of this process is implementing shape estimation of the entire riser with the extended Kalman filter. From a number of tests, the appropriate Q value was set as Equation 11, which shows good estimation and no divergence of P.

$$Q = \text{diag}\begin{pmatrix} 5 \times 10_1^{-4} \\ 5 \times 10_2^{-4} \\ \vdots \\ 5 \times 10_{i-1}^{-4} \\ 5 \times 10_i^{-4} \end{pmatrix} \quad (6)$$

where i: length of X.

The parameter R was calculated using Equation 12. The standard deviation of inclination and heading sensor errors are set to be 0.05° and 0.08°, respectively, referring to the test result of a commercial product. (See, e.g., Safran, https://www.safran-electronics-defense.com/file/download/bluenaute.pdf, 2020; Vectory Sensor Systems, https://www.vectory.com/products/subsea-tilt-sensors-inclinometers/microrad/, 2020, which are incorporated herein by reference.)

$$R = \text{diag}\begin{pmatrix} \beta_1^2 \\ \gamma_1^2 \\ \beta_2^2 \\ \gamma_2^2 \\ \vdots \\ \beta_{i-2}^2 \\ \gamma_{i-2}^2 \\ \beta_{i-1}^2 \\ \gamma_{i-1}^2 \end{pmatrix} \quad (7)$$

where
- $\beta$: inclination sensor noise (error) standard deviation
- $\gamma$: heading sensor noise (error) standard deviation
- l: half the length of X Next, how the EKF algorithm can be utilized for real-time inverse estimation of a riser's deformed shape from sensor signals is explained.

Figure 4A:
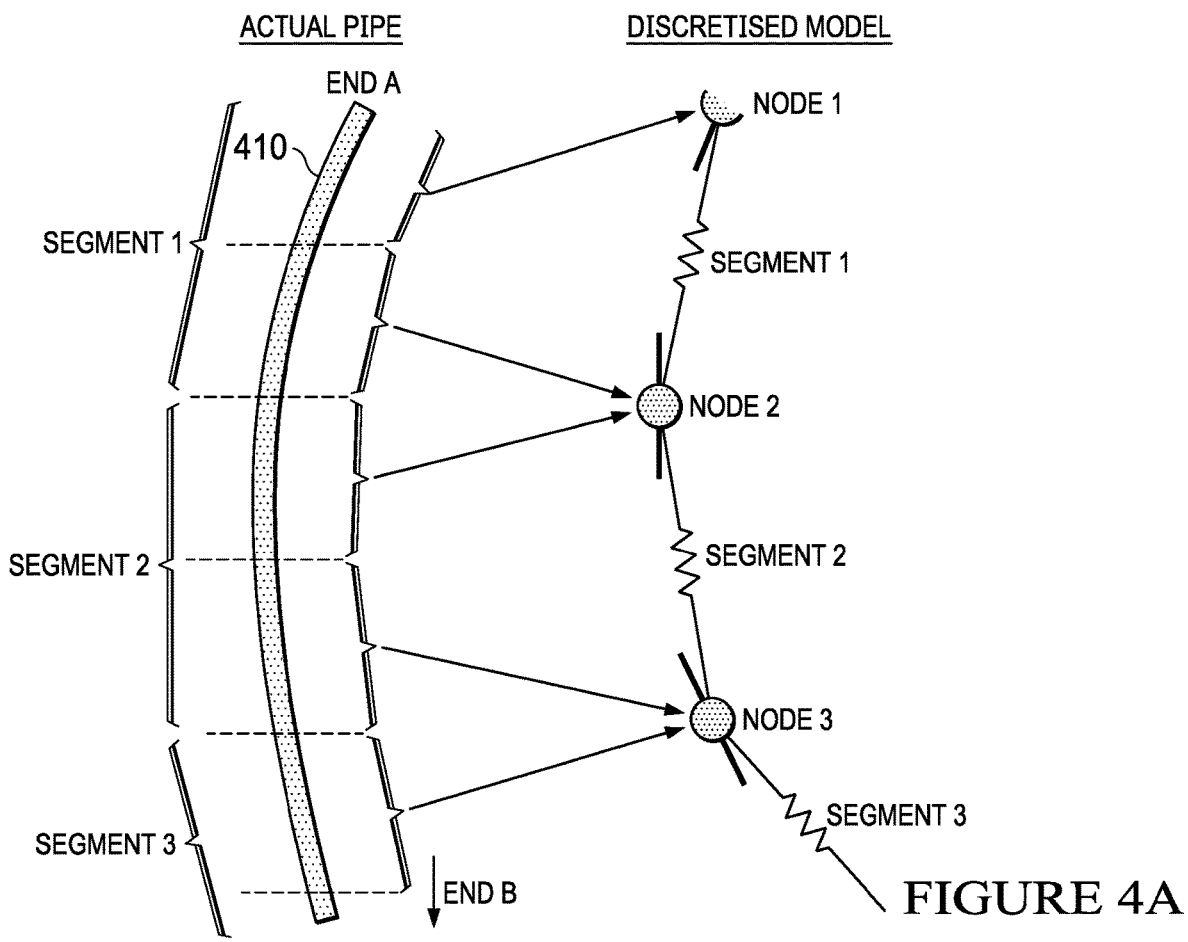
FIGS. 4A and 4B illustrate graphical representations of an embodiment of a riser model showing nodes and segments, and uniform elongation of a riser.
Figure 4B:
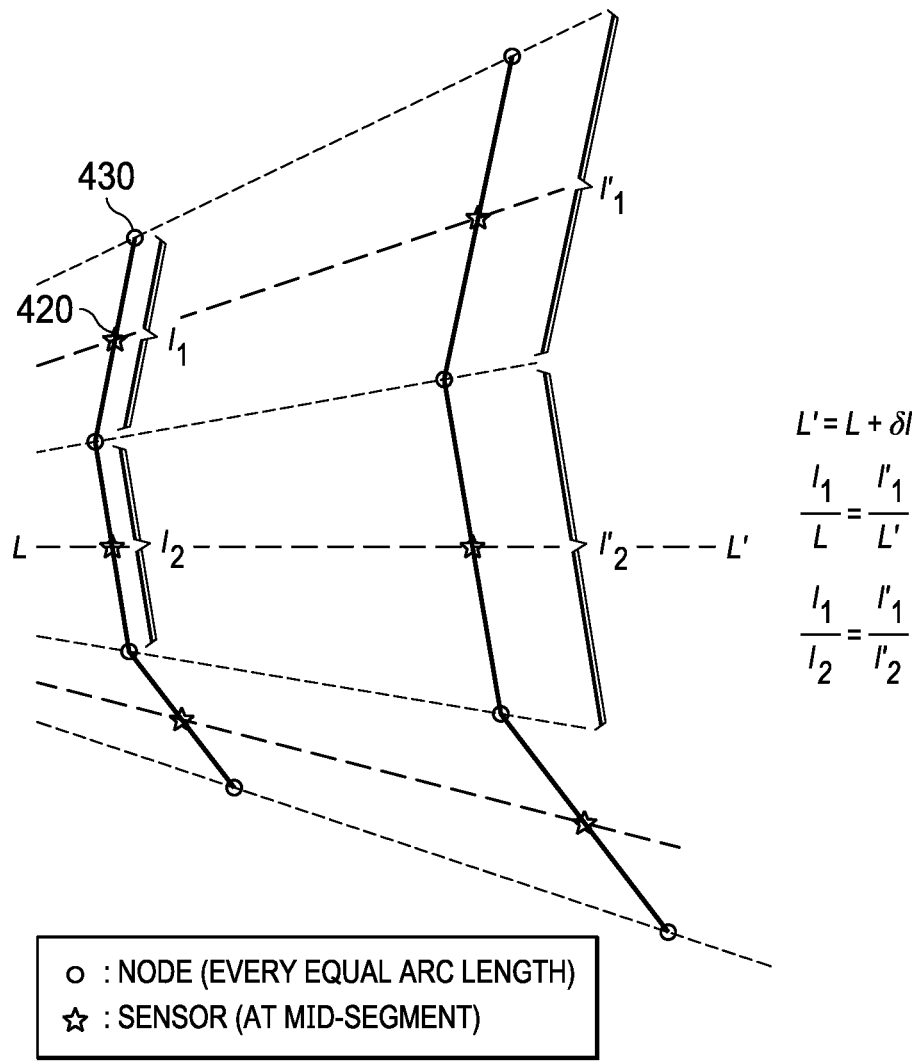

Turning now to FIGS. 4A and 4B, illustrated are graphical representations of an embodiment of a lumped-mass-based riser model, showing nodes and riser segments (FIG. 4A) and uniform elongation of a riser (FIG. 4B). A continuous riser is divided into a certain number of nodes and segments. Inclinometers are positioned in the middle of segments, e.g., the middle 410 of segment 1. FIG. 4B illustrates a sensor, e.g., 420, at a mid-segment, and a node, e.g., 430, positioned at one of equal art lengths. As inclination and heading are measured by the installed sensors along the riser, the developed Kalman filter can estimate the displacements of each node by the given sensor signals at each time step. Connecting the estimated nodes provides an initial estimated deformed shape of the riser.

Figure 5:
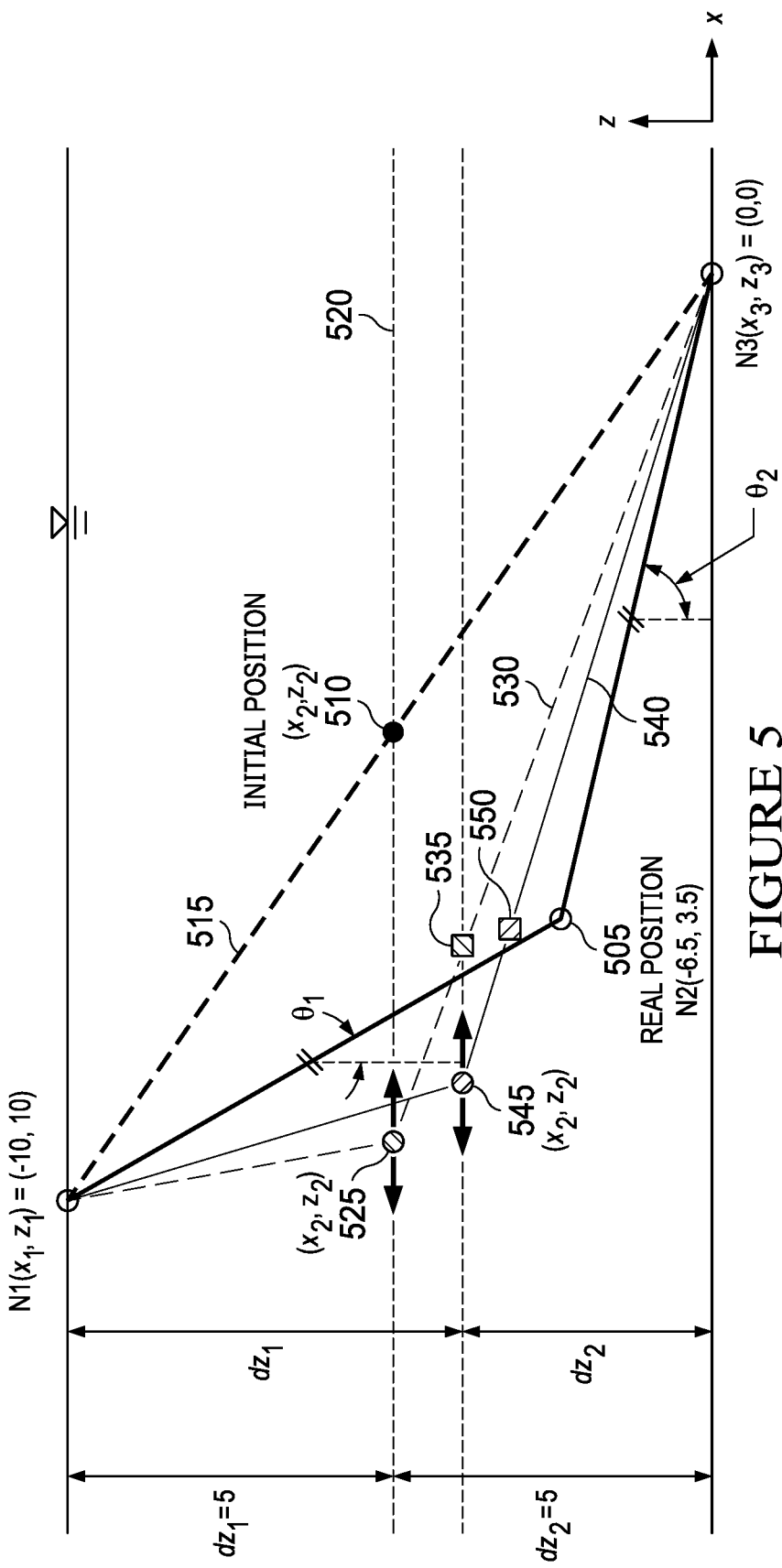
FIG. 5 illustrates a graphical representation of an embodiment of an estimation process for a riser in two dimensions with three nodes.

Turning now to FIG. 5, illustrated is a graphical representation of an embodiment of an estimation process for a riser in two dimensions with three nodes, thereby illustrating the estimation process at each time step. TABLE 3 below illustrates EKF computation at time step (k), thereby explaining the estimation process at each time step. The estimation process in 2D with three nodes proceeds at continuing time steps.

TABLE 3

| Time Step (k) | k = 1 | k = 2 | k = 3 |
|---|---|---|---|
| Reference Vertical Coordinate ("RVC") (Estimated vertical position of node) | $dz_2$ = 5.0 (initial) | $dz_2$ = 4.5 | $dz_2$ = 4.0 |
| Measured Segment Inclination | $\theta_1 = 28°$ $\theta_1 = 62°$ | $\theta_1 = 28°$ $\theta_1 = 62°$ | |
| Estimated Position of N2 by EKF $(x_2, z_2)$ | $(x_2, z_2) = (-8, 5)$ Ref. No. 525 | $(x_2, z_2) = (-7, 4.5)$ Ref. No. 545 | $(x_2, z_2) = (-6.5, 3.5)$ Ref. No. 505 |
| Calculate Midpoint of Line Length | (-6.7, 4.5) Ref. No. 535 | (-6.6, 4.0) Ref. No. 550 | |
| Update Reference Vertical Coordinate | $dz_2$ = 4.5 | $dz_2$ = 4.0 | |
| Next Step | Move to k = 2 (RVC) | Move to k = 3 (RVC) | |

As mentioned before, the 3D problem with time-varying angles is actually solved at each time step. However, as illustrated in FIG. 5, the 2D problem (inclination considered, heading not considered) is explained for simplicity. Besides, for demonstration purpose, only three nodes of N1-N3 are considered with one unknown point of node N2 ($x_2$, $z_2$), which needs to be solved. It is assumed that the two inclination angles at the two ends, N1 and N3, are $\theta_1=28$ and $\theta_2=62$ degrees, and the vertical distance between the two points is given by 10 meters ("m"). At each time step, the position of node N2 ($x_2$, $z_2$) is estimated while satisfying the given inclinations of riser segments and mid-length requirement. The blue dot 505 is the actual position of the center node N2 (−6.5, 3.5). As for the mid-point, the lengths of the upper and lower segments should be the same.

The detailed calculation process is as follows. (1) At time step k=1: Before starting the prediction, the initial position of node N2 ($x_2$, $z_2$) should be determined. Since the positions of nodes at both ends are already known, the central point (orange circle 510 in the orange dashed line 515 initial position ($x_2$, $z_2$)) of the straight line connecting the two nodes is set to be the initial position of point N2 and the initial values of dz are then determined to be 5 meters each. Next, the Kalman filter predicts the x coordinate of the node N2 on the horizontal line (red dashed line 520) corresponding to $dz_2=5$ meters satisfying the slopes $\theta_1$ and $\theta_2$ from the sensors, which corresponds to the red circle 525 (−8.0 m, 5.0 m). However, this position violates the mid-point condition. As a result, N2 is updated along the already estimated riser profile (red line 530) so that both segment lengths can be identical, which corresponds to the red box 535 (−6.7 m, 4.5 m). Next, update the vertical location of the node N2, i.e., $dz_2=4.5$ m for the next time step.

(2) At the next time step for k=2, the x coordinate is predicted on the horizontal line (green dashed line 540) corresponding to $dZ_2=4.5$ m, which also satisfies the slopes $\theta_1$ and $\theta_2$ from the sensors. The estimated position corresponds to the green circle 545 (−7.0 m, 4.5 m). The length of each segment is again calculated based on this estimated position. Next, the center position of the total length is recalculated along the green line 540 so that both lengths can be identical, which is corresponding to the green box 550 (−6.6 m, 4.0 m). The vertical location of node N2 is updated again, i.e., $dz_2=4$ m. This process is repeated for every time step until satisfactory convergence is achieved, i.e., the predicted position of the node N2 converges to the blue circle 505 after several time steps, which is the actual position.

Figure 6:
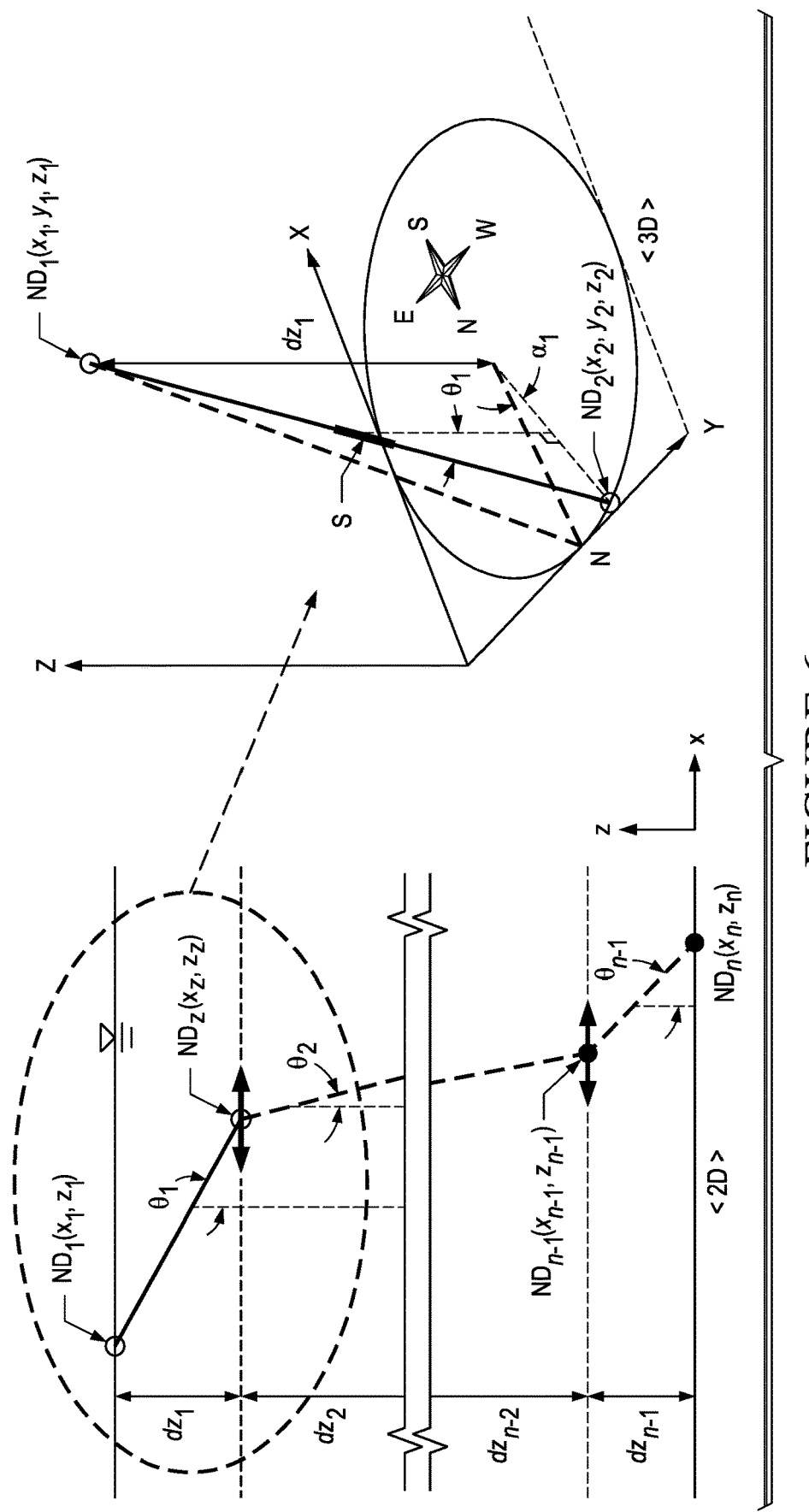
FIG. 6 illustrates a graphical representation of geometry for an embodiment of an estimation process for a riser in two dimensions and three dimensions with n nodes.

In summary, the position of the node N2 is estimated at each time step while satisfying the two given angle and length requirements. The same process runs simultaneously for the whole segments inside a combined matrix until all the requirements are simultaneously satisfied. As shown in FIG. 6, the 2D problem can logically be expanded to a 3D problem with additional heading angles and y coordinates of the nodes.

Turning now to FIG. 6, illustrated is a graphical representation of geometry for an embodiment of an estimation process for a riser in two dimensions ("2D") and three dimensions ("3D") with n nodes. In FIG. 6:

$\theta$=mid-segment inclination
$\alpha$=mid-segment heading
n=the number of nodes
x=estimated x coordinate of node
y=estimated y coordinate of node
dz=estimated vertical component of segment length One of the important issues to the Kalman filter is to establish the observation equation, also referred to as the output equation. The relationship between measurement and estimated state is defined in the observation equation. In this study, measurement is the inclination and heading at each segment, while the state is x and y coordinates of each node. The vertical coordinate is determined by updated at every time step. Based on the configuration shown in FIG. 6, the observation equation can be expressed as:

$$\theta_n = h_1(x_n, x_{n+1}, y_n, y_{n+1}) = \arctan\left(\frac{\sqrt{(x_{n+1} - x_n)^2 + (y_{n+1} - y_n)^2}}{dz_n}\right) \quad (8)$$

$$\alpha_n = h_2(x_n, x_{n+1}, y_n, y_{n+1}) = \arctan\left(\frac{y_{n+1} - y_n}{x_{n+1} - x_n}\right) \quad (14)$$

In the equations above, $h_1$ and $h_2$ are functions for inclination (Equation 13) and heading (Equation 14), respectively.

Figure 7:
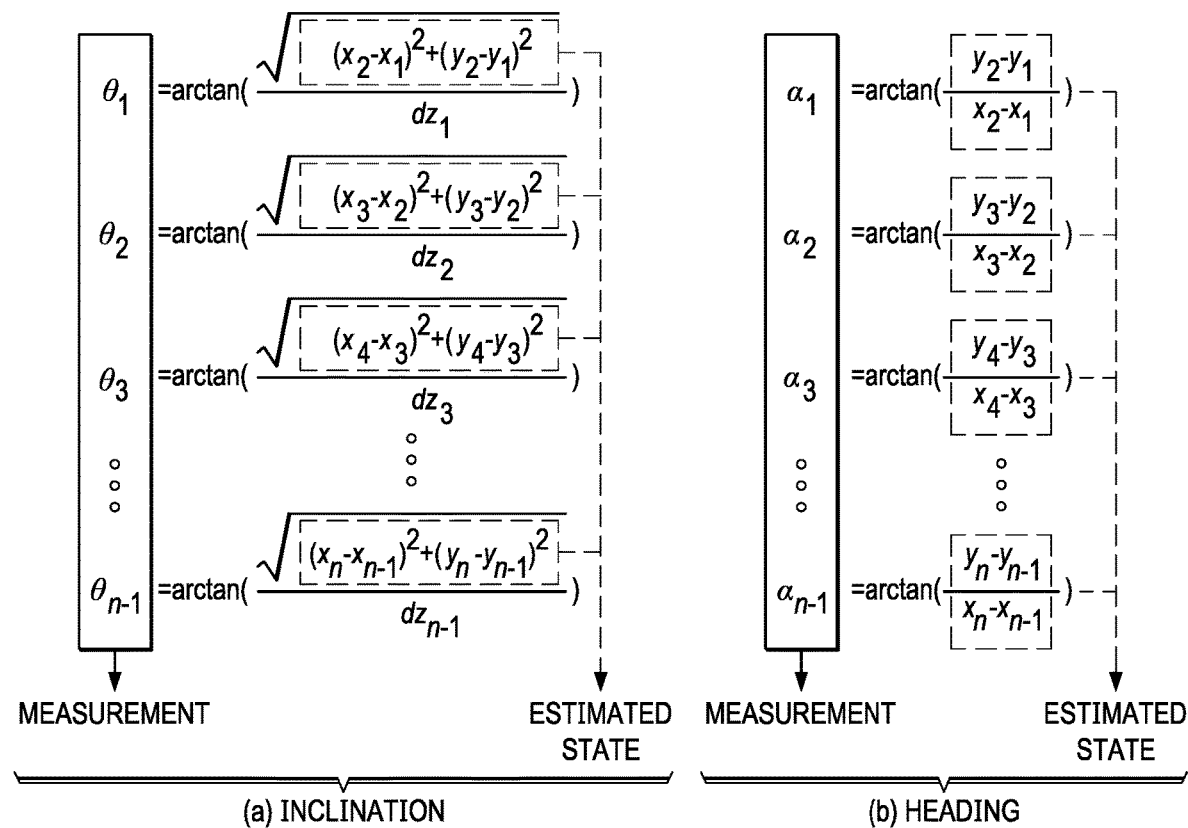
FIG. 7 illustrates a block diagram of equations employed for nonlinear inclination and heading observations for a riser.

Turning now to FIG. 7, illustrated is a block diagram of an embodiment of observation equations for a nonlinear inclination (a) and heading (b) observation equations for a riser state with n nodes. As mentioned before, the above nonlinear observation equation cannot be directly applied to the Kalman filter. In this regard, the EKF with the corresponding Jacobian matrix is needed to linearize a nonlinear system model. Equation 15 is the original nonlinear equation, i.e., z=h(X), while Equation 16 is the corresponding linearized equation by means of the Jacobian matrix, i.e., $z=J_h*X=H*X$. The 2(n−1) by 2n Jacobian matrix was constructed by considering not only the 2(n−1) measurements and 2n state but also the respective observation equation.

$$\begin{bmatrix} \theta_1 \\ \alpha_1 \\ \theta_2 \\ \alpha_2 \\ \vdots \\ \theta_{n-2} \\ \alpha_{n-2} \\ \theta_{n-1} \\ \alpha_{n-1} \end{bmatrix} = \begin{bmatrix} h_1(x_1, x_2, y_1, y_2) \\ h_2(x_1, x_2, y_1, y_2) \\ h_1(x_2, x_3, y_2, y_3) \\ h_2(x_2, x_3, y_2, y_3) \\ \vdots \\ h_1(x_{n-2}, x_{n-1}, y_{n-2}, y_{n-1}) \\ h_2(x_{n-2}, x_{n-1}, y_{n-2}, y_{n-1}) \\ h_1(x_{n-1}, x_n, y_{n-1}, y_n) \\ h_2(x_{n-1}, x_n, y_{n-1}, y_n) \end{bmatrix} \quad (9)$$

$$\begin{bmatrix} \theta_1 \\ \alpha_1 \\ \theta_2 \\ \alpha_2 \\ \vdots \\ \theta_{n-2} \\ \alpha_{n-2} \\ \theta_{n-1} \\ \alpha_{n-1} \end{bmatrix} = \begin{bmatrix} \frac{\partial\theta_1}{\partial x_1} & \frac{\partial\theta_1}{\partial x_2} & 0 & 0 & \cdots & \frac{\partial\theta_1}{\partial y_1} & \frac{\partial\theta_1}{\partial y_2} & 0 & 0 & \cdots \\ \frac{\partial\alpha_1}{\partial x_1} & \frac{\partial\alpha_1}{\partial x_2} & 0 & 0 & \cdots & \frac{\partial\alpha_1}{\partial y_1} & \frac{\partial\alpha_1}{\partial y_2} & 0 & 0 & \cdots \\ 0 & \frac{\partial\theta_2}{\partial x_2} & \frac{\partial\theta_2}{\partial x_3} & 0 & \cdots & 0 & \frac{\partial\theta_2}{\partial y_2} & \frac{\partial\theta_2}{\partial y_3} & 0 & \cdots \\ 0 & \frac{\partial\alpha_2}{\partial x_2} & \frac{\partial\alpha_2}{\partial x_3} & 0 & \cdots & 0 & \frac{\partial\alpha_2}{\partial y_2} & \frac{\partial\alpha_2}{\partial y_3} & 0 & \cdots \\ & & & & \ddots & & & & & \\ \cdots & 0 & \frac{(\partial\theta_{n-2})}{(\partial x_{n-2})} & \frac{(\partial\theta_{n-2})}{(\partial x_{n-1})} & 0 & \cdots & 0 & \frac{(\partial\theta_{n-2})}{(\partial y_{n-2})} & \frac{(\partial\theta_{n-2})}{(\partial y_{n-1})} & 0 \\ \cdots & 0 & \frac{\partial\alpha_{n-2}}{\partial x_{n-2}} & \frac{\partial\alpha_{n-2}}{\partial x_{n-1}} & 0 & \cdots & 0 & \frac{\partial\alpha_{n-2}}{\partial y_{n-2}} & \frac{\partial\alpha_{n-2}}{\partial y_{n-1}} & 0 \\ \cdots & 0 & 0 & \frac{\partial\theta_{n-1}}{\partial x_{n-1}} & \frac{(\partial\theta_{n-1})}{(\partial x_n)} & \cdots & 0 & 0 & \frac{\partial\theta_{n-1}}{\partial y_{n-1}} & \frac{(\partial\theta_{n-1})}{(\partial y_n)} \\ \cdots & 0 & 0 & \frac{\partial\alpha_{n-1}}{\partial x_{n-1}} & \frac{\partial\alpha_{n-1}}{\partial x_n} & \cdots & 0 & 0 & \frac{\partial\alpha_{n-1}}{\partial y_{n-1}} & \frac{\partial\alpha_{n-1}}{\partial y_n} \end{bmatrix} \cdot \begin{bmatrix} x_1 \\ x_2 \\ \vdots \\ x_{n-1} \\ x_n \\ y_1 \\ y_2 \\ \vdots \\ y_{n-1} \\ y_n \end{bmatrix} \quad (10)$$

$$\begin{bmatrix} \theta_1 \\ \alpha_1 \\ \theta_2 \\ \alpha_2 \\ \vdots \\ \theta_{n-2} \\ \alpha_{n-2} \\ \theta_{n-1} \\ \alpha_{n-1} \end{bmatrix} = \begin{bmatrix} -\frac{x_2-x_1}{dz_1\sqrt{(x_2-x_1)^2+(y_2-y_1)^2}} & \frac{x_2-x_1}{dz_1\sqrt{(x_2-x_1)^2+(y_2-y_1)^2}} & 0 & 0 & \cdots \\ \frac{y_2-y_1}{\left(\frac{(x_2-x_1)^2+(y_2-y_1)^2}{(dz_1^2)}+1\right)} & \frac{\left(\frac{(x_2-x_1)^2+(y_2-y_1)^2}{(dz_1^2)}+1\right)}{} & & & \\ \frac{y_2-y_1}{\left(\frac{(y_2-y_1)^2}{(x_2-x_1)^2}+1\right)(x_2-x_1)^2} & -\frac{y_2-y_1}{\left(\frac{(y_2-y_1)^2}{(x_2-x_1)^2}+1\right)(x_2-x_1)^2} & 0 & 0 & \cdots \\ & & \ddots & & \\ \cdots & 0 & 0 & -\frac{y_n-y_{n-1}}{dz_{n-1}\sqrt{(x_n-x_{n-1})^2+(y_n-y_{n-1})^2}} & \frac{y_n-y_{n-1}}{dz_{n-1}\sqrt{(x_n-x_{n-1})^2+(y_n-y_{n-1})^2}} \\ & & & \left(\frac{(x_n-x_{n-1})^2+(y_n-y_{n-1})^2}{(dz_{n-1}^2)}+1\right) & \left(\frac{(x_n-x_{n-1})^2+(y_n-y_{n-1})^2}{(dz_{n-1}^2)}+1\right) \\ \cdots & 0 & 0 & -\frac{1}{(x_n-x_{n-1})\left(\frac{(y_n-y_{n-1})^2}{(x_n-x_{n-1})^2}+1\right)} & \frac{1}{(x_n-x_{n-1})\left(\frac{(y_n-y_{n-1})^2}{(x_n-x_{n-1})^2}+1\right)} \end{bmatrix} \cdot \begin{bmatrix} x_1 \\ x_2 \\ \vdots \\ x_{n-1} \\ x_n \\ y_1 \\ y_2 \\ \vdots \\ y_{n-1} \\ y_n \end{bmatrix} \quad (11)$$

Equation 17 can be derived after conducting partial derivatives.

Figure 8:
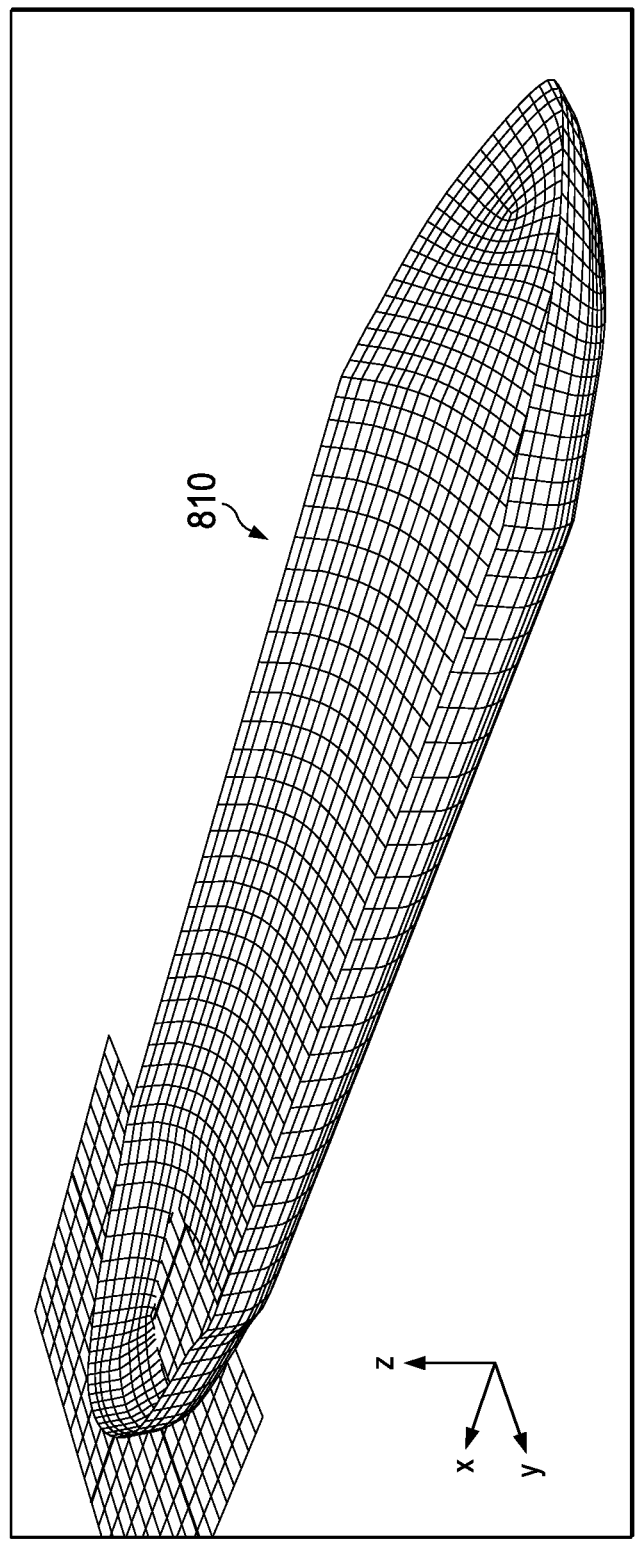
FIG. 8 illustrates a graphical representation of an embodiment of a floating production storage and offloading ("FPSO") hull panel model.

To validate the EKF-based monitoring system, a floater-mooring-riser coupled time-domain simulation was performed. A floating production storage and offloading ("FPSO") was selected as a floating structure. The principal dimensions of the vessel are presented in TABLE 4. (See, e.g., Kim S, Kim M-H, "Dynamic behaviors of conventional SCR and lazy-wave SCR for FPSOs in deepwater," Ocean Engineering, 106 (2015) 396-414, which is incorporated herein by reference.) A 3D diffraction/radiation panel program was used to estimate hydrodynamic coefficients and wave loads in the frequency domain. (See, e.g., Lee C H, Newman J N, Kim M H, Yue D K P, "The computation of second-order wave loads," Proceeding of OMAE Conference. Stavanger, Norway: American Society of Mechanical Engineers; 1991, which is incorporated herein by reference.) A panel model that is employed to represent the FPSO hull 810 is shown graphically in FIG. 8. The total number of 2,448 panels was chosen after a convergence test.

TABLE 4

| Designation | Unit | Value |
| --- | --- | --- |
| Vessel size | kDWT | 200 |
| Length between perpendicular | m | 310 |
| Breadth | m | 47.17 |
| Depth | m | 28.04 |
| Draft | m | 18.90 |

TABLE 4-continued

| Designation | Unit | Value |
| --- | --- | --- |
| Displacement | MT | 240,869 |
| Block coefficient | Dimensionless | 0.85 |
| Center of gravity above Base | m | 13.30 |
| Water plane area | m$^2$ | 13,400 |
| Roll radius of gyration at CG | m | 14.77 |
| Pitch radius of gyration at CG | m | 77.47 |
| Yaw radius of gyration CG | m | 79.30 |

Figure 9:
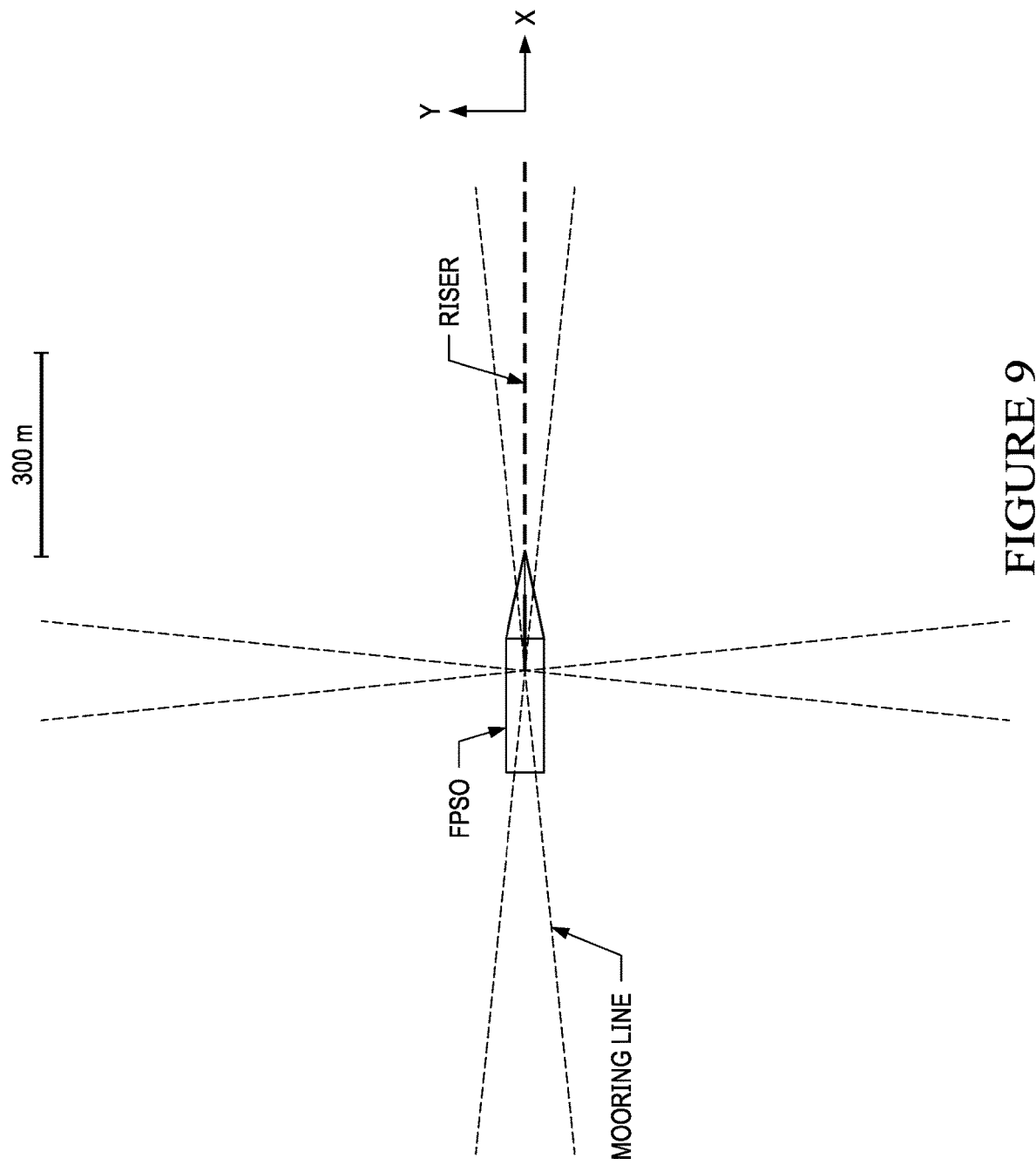
FIG. 9 illustrates a graphical representation of an embodiment illustrating a numerical model for a mooring line employed with a turret-moored FPSO system with a selected riser.

After the frequency-domain calculation, time-domain simulations were performed with mooring lines and steel catenary risers ("SCRs"). The Morison equation estimated the wave loading on the slender mooring lines and risers. Turret mooring system with eight mooring lines was considered, and the riser was also connected to the turret. Riser properties are given in TABLE 5. A commercial program OrcaFlex was used for the time-domain simulation of the coupled system. During the time-domain simulation, multiple numerical inclinometers were placed for providing the supposedly measured inclination and heading angle signals at the target points. To make it more realistic and practical, artificial white noise was added within the noise range provided by the sensor manufacturer. They were used as measurement data for the ensuing EKF algorithm. FIG. 9 shows the designed numerical model in OrcaFlex.

TABLE 5 below illustrates example steel catenary riser parameters.

TABLE 5

| Parameters | Unit | Value |
|---|---|---|
| Outer diameter | mm | 461 |
| Wall thickness | mm | 21 |
| Coating thickness | mm | 75 |
| Young's modulus | GPa | 207 |
| Yield stress | MPa | 448 |
| Steel density | kg/m$^3$ | 7850 |
| Coating density | kg/m$^3$ | 800 |

Example environmental conditions are summarized below in TABLE 6.

TABLE 6

| Environment | Item | GOM 1-year wave | GOM 100-year wave |
|---|---|---|---|
| Wave | Significant wave height ( ) | 4.30 m | 12.19 m |
| | Perk period ( ) | 9.0 sec | 14.0 sec |
| | Enhancement parameter ( ) | 2.0 | 2.5 |
| Current | Velocity | 0.33 m/s | 1.07 m/s |

Gulf of Mexico's (GOM) 1-year and 100-year wave conditions were considered with corresponding current velocities. As presented in TABLE 7 below, four different environmental conditions were considered. The JONSWAP wave spectrum was adopted with appropriate enhancement parameters, and 200 regular wave components were superposed to generate irregular waves. The simulation time for each case was 4000 seconds. Water depth was fixed to be 700 meters. Signal repetition was prevented by using the equal energy discretization method in which each wave component has an equal amount of spectral energy. For convenience, random waves and steady shear currents are considered, but wind was not included since it does not directly influence riser dynamics.

Simulated cases under different sea states and directions are illustrated below in TABLE 7.

TABLE 7

| Case No. | (m) | (sec) | Wave direction (deg) | Current (m/s) | Current direction (deg) |
|---|---|---|---|---|---|
| 1 (GOM 1-year waves/Collinear) | 4.30 | 9.0 | 180 | 0.33 | 180 |
| 2 (GOM 1-year waves/Non-collinear) | 4.30 | 9.0 | 190 | 0.33 | 120 |
| 3 (GOM 100-year waves/Collinear) | 12.19 | 14.0 | 180 | 1.07 | 180 |
| 4 (GOM 100-year waves/Non-collinear) | 12.19 | 14.0 | 190 | 1.07 | 120 |

Turning now to FIG. 10, illustrates a graphical representation of an embodiment of riser 1000 with an arrangement 1010 of sensors (one of which is designated 1020) proximate nodes 1030, 1040, and a seabed 1050 to which the riser 1000 is coupled. Inclinometers are located at sensor positions such as at the position of sensor 1020.

As mentioned hereinabove, an SCR attached to the FPSO was tested to verify the developed ETF-based monitoring method. Along the riser 1000, there are ten sensors (again, one designated 1020, e.g., inclinometers) that can measure inclination and heading. The distance between the sensors 1020 was assumed to be identical. Then the position of the riser-top point and bi-axial angles at the sensor location were produced by the time-domain simulation, and they were inputted to the EKF algorithm at each data-sampling time step.

Turning now to FIGS. 11A, 11B and 11C, illustrated are graphical representations of surge (A), sway (B) and heave (C) motions of the FPSO from the time-domain simulation under the non-collinear environmental condition of Case 4 (see TABLE 7). The generated time series shows typical surge (x-direction), sway (y-direction) and heave (z-direction) characteristics of an FPSO in a given environment. (See, e.g., Kim M, Koo B, Mercier R, Ward E, "Vessel/mooring/riser coupled dynamic analysis of a turret-moored FPSO compared with OTRC experiment," Ocean Engineering, 32(2005) 1780-1802, which is incorporated herein by reference.) The data sampling frequency was 5 hertz ("Hz").

Figure 12A:
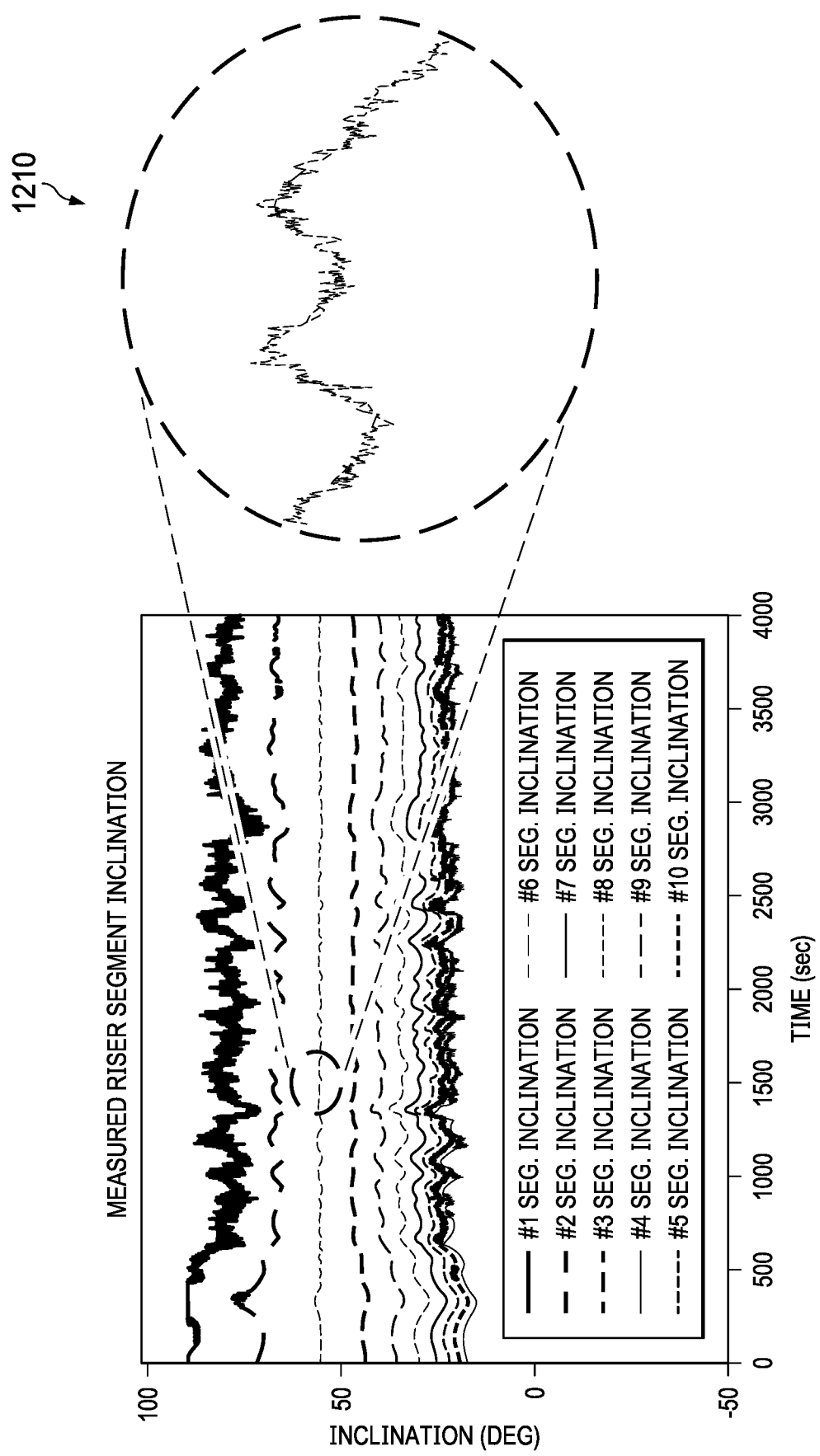
FIGS. 12A and 12B illustrate graphical representations of the time histories of the inclination (A) and heading (B) of the riser at sensor locations under the environmental condition of Case 4 (see TABLE 7)
Figure 12B:
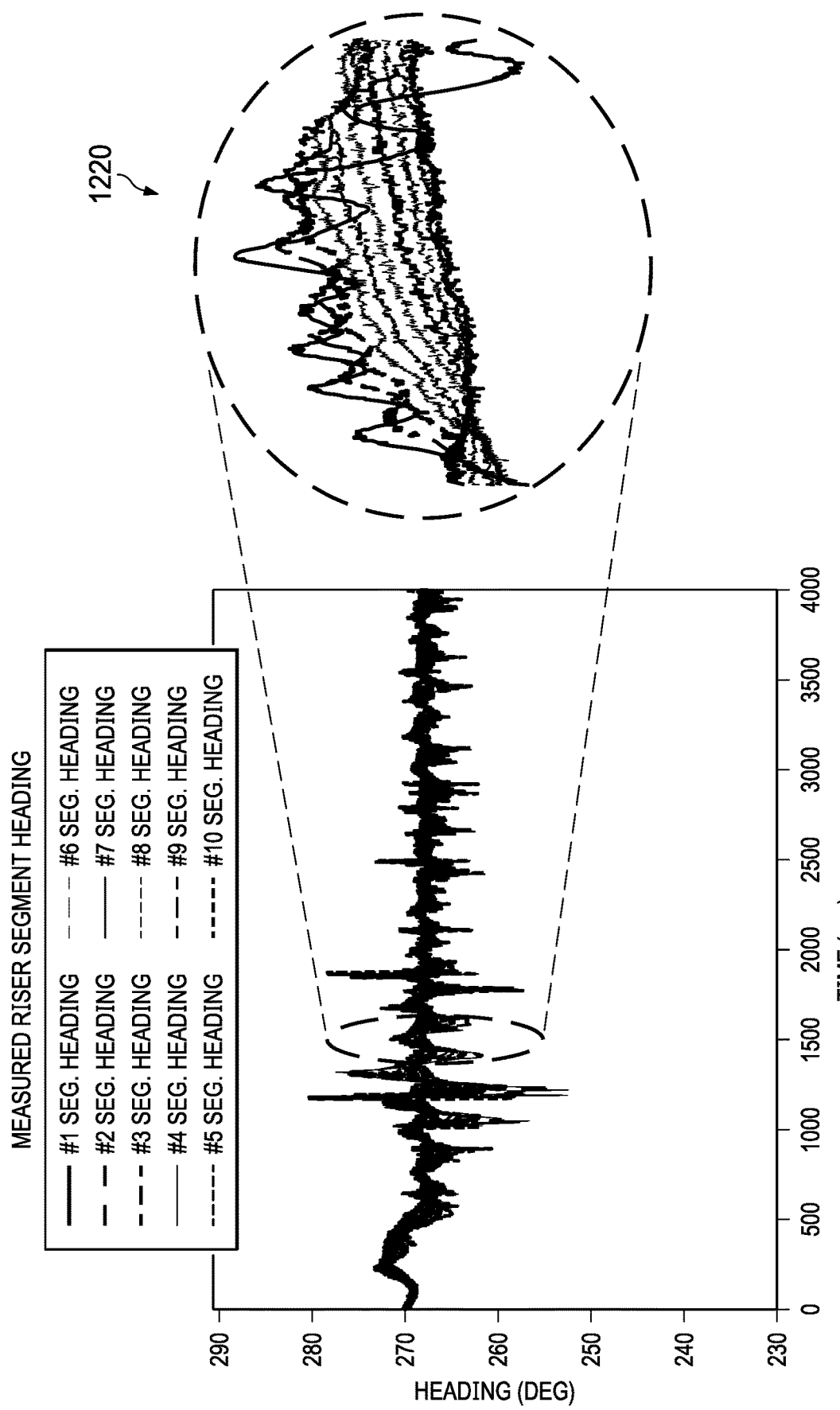

Turning now to FIGS. 12A and 12B, illustrated are graphical representations of the time histories of the inclination (A) and heading (B) of the riser at sensor locations (e.g., 10 numerical inclinometers) under the environmental condition of Case 4 (see TABLE 7). A white noise equivalent to the standard deviation of sensor error was artificially added, and thus high-frequency fluctuations can be observed in the signals. If the FIGS. is zoomed in, the error (or sensor noise designated 1210, 1220) is more visible as illustrated.

Figure 13B:
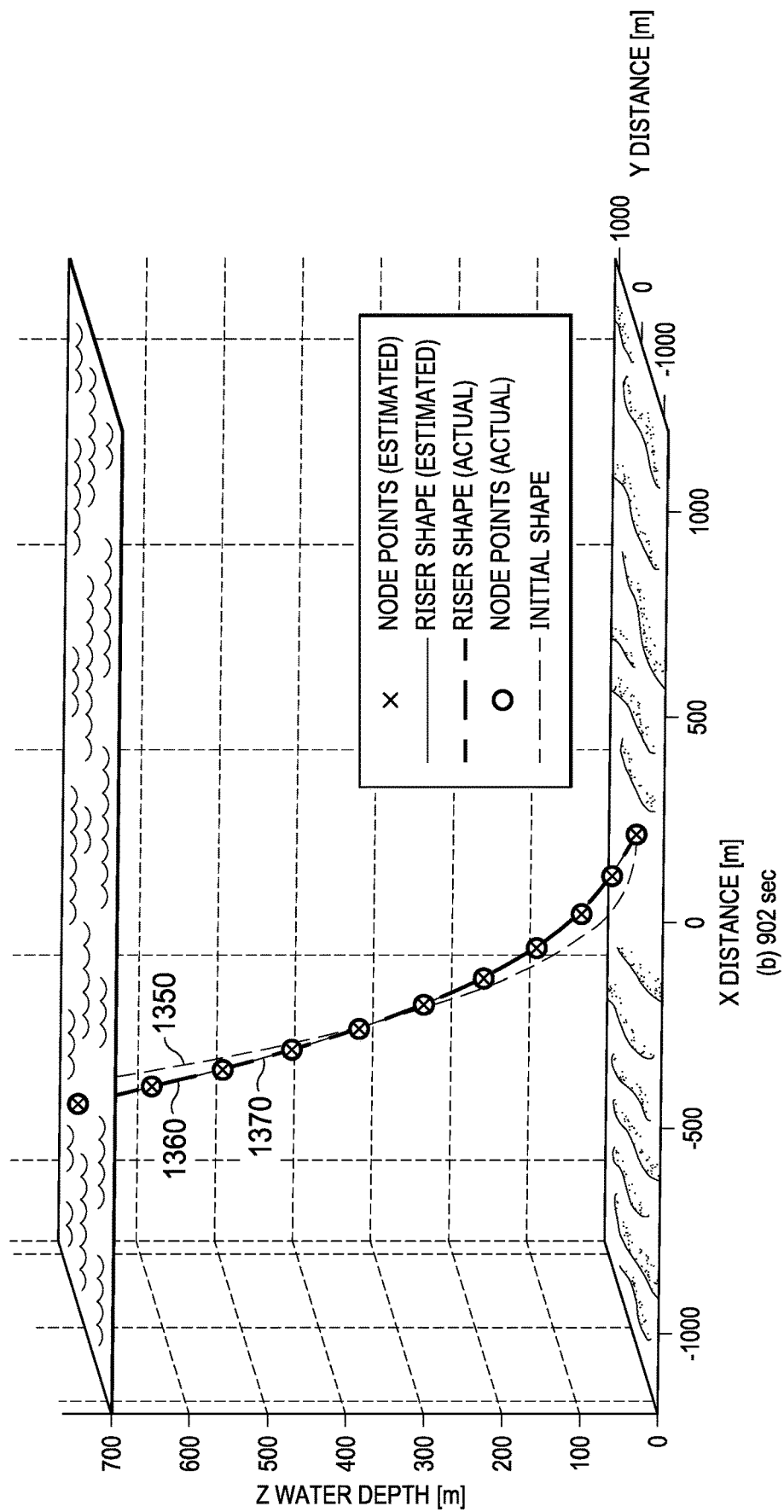
Figure 14A:
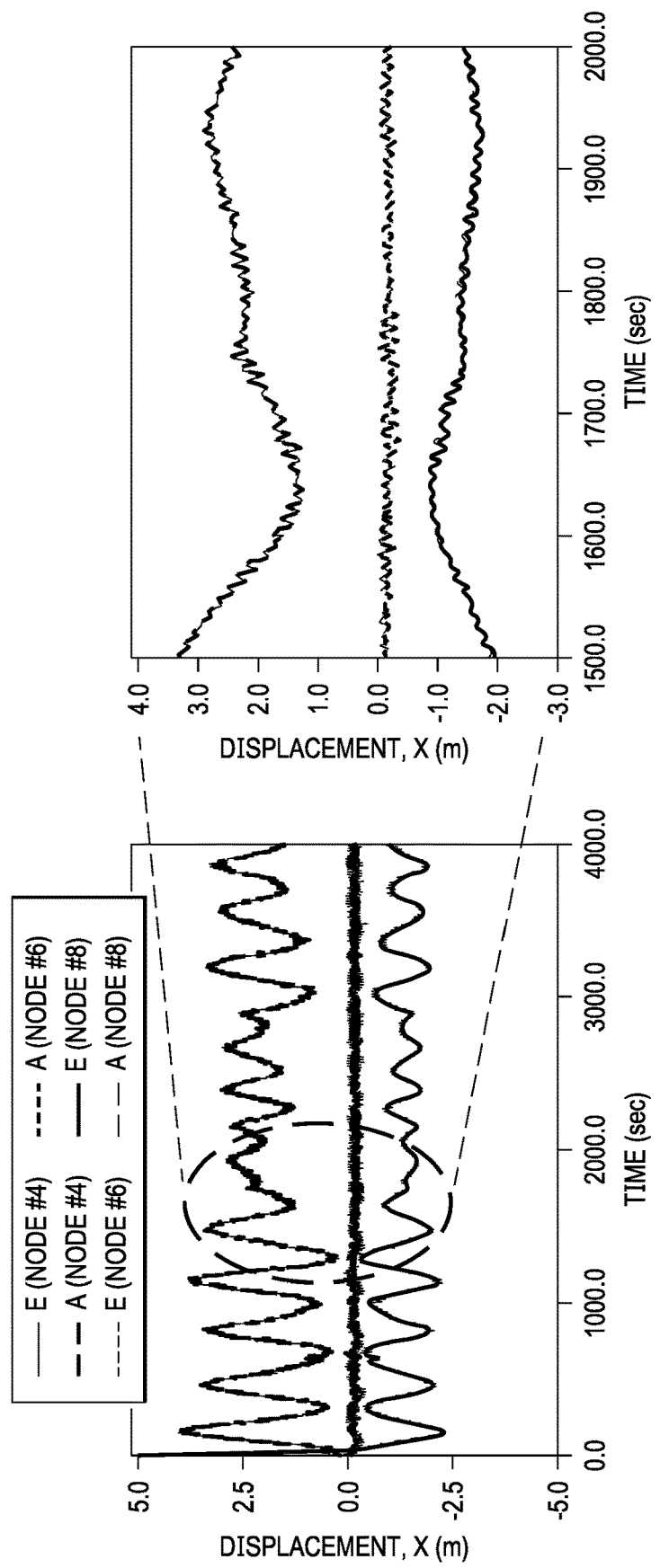
FIGS. 14A, 14B, 14C, 15A, 15B, 15C, 16A, 16B, 16C, 17A, 17B and 17C illustrate graphical representations of time histories of the actual and estimated riser responses under four different environmental conditions of Case 1 to 4 (see TABLE 7)
Figure 14B:
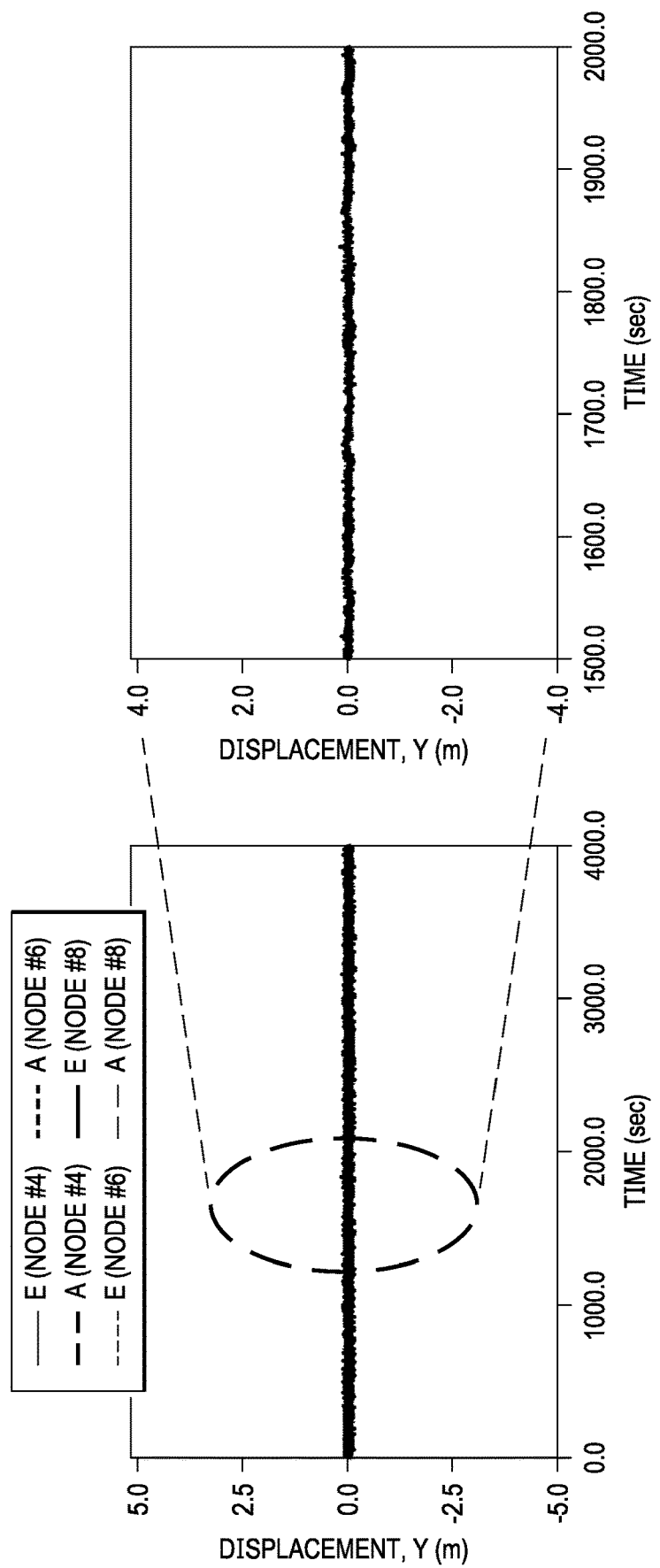
Figure 14C:
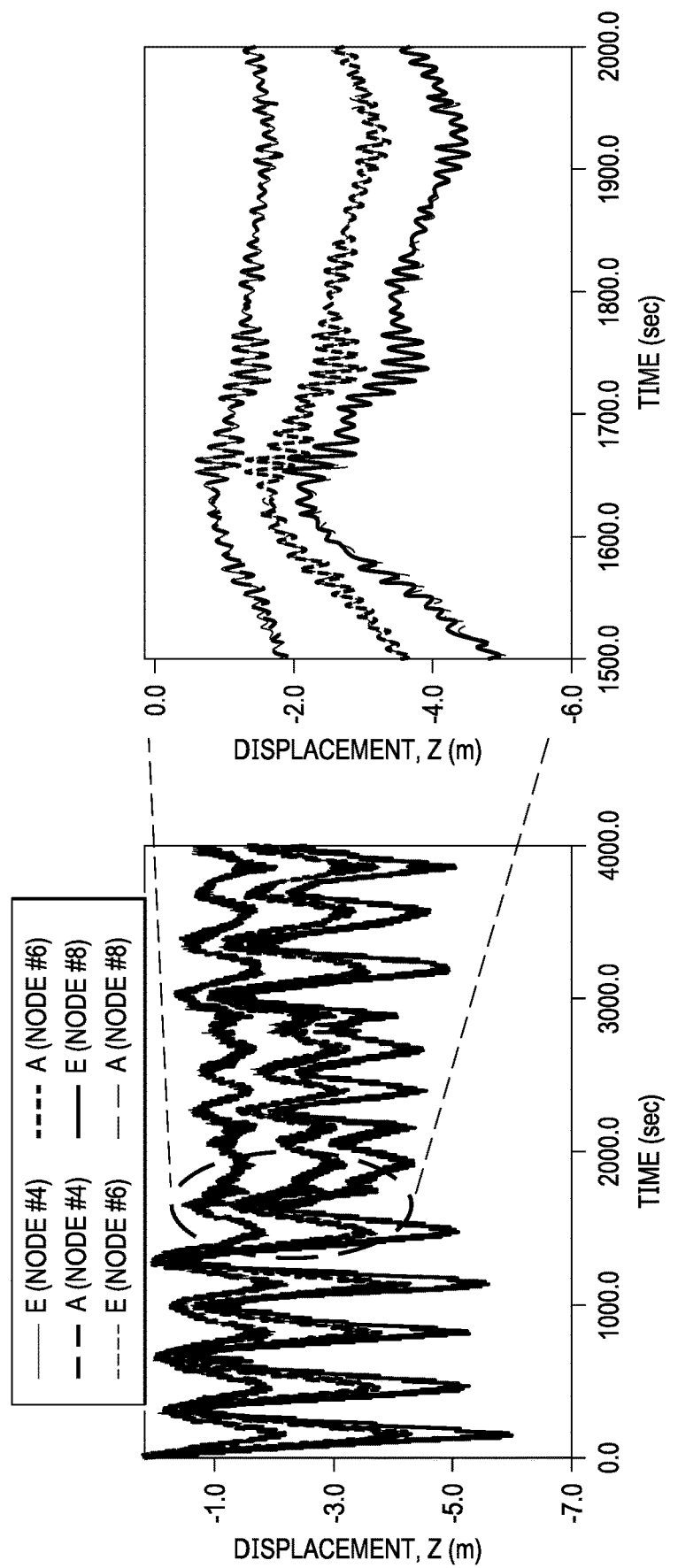
Figure 15A:
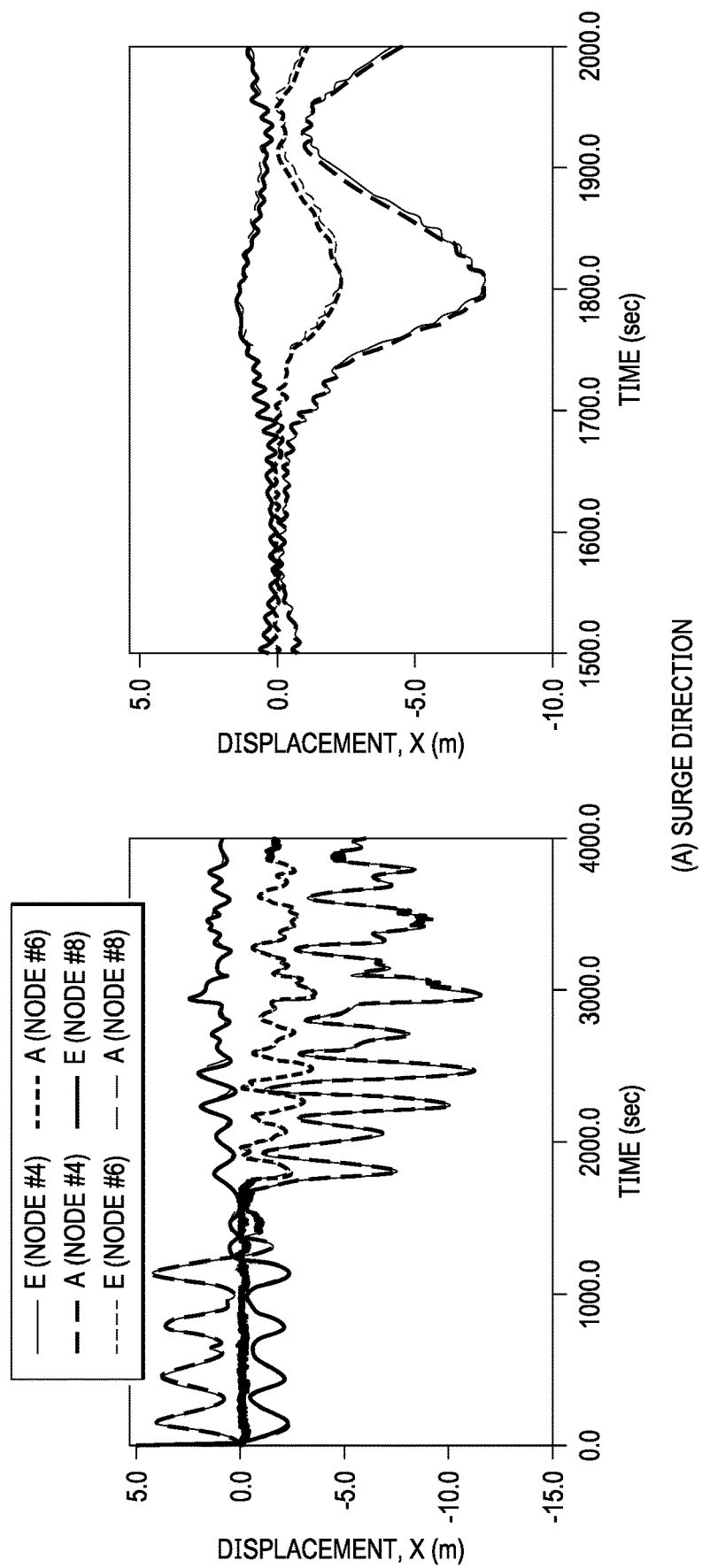
Figure 15B:
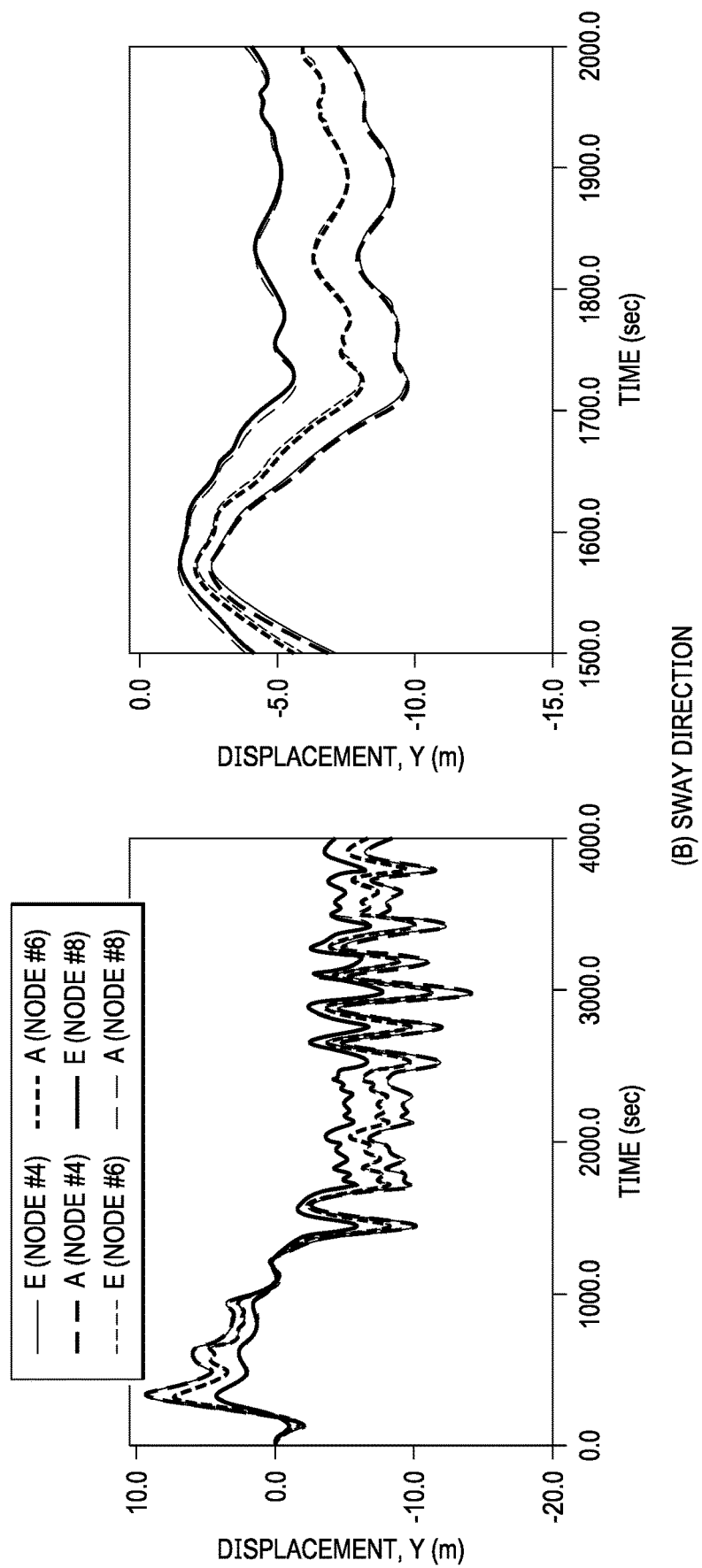
Figure 15C:
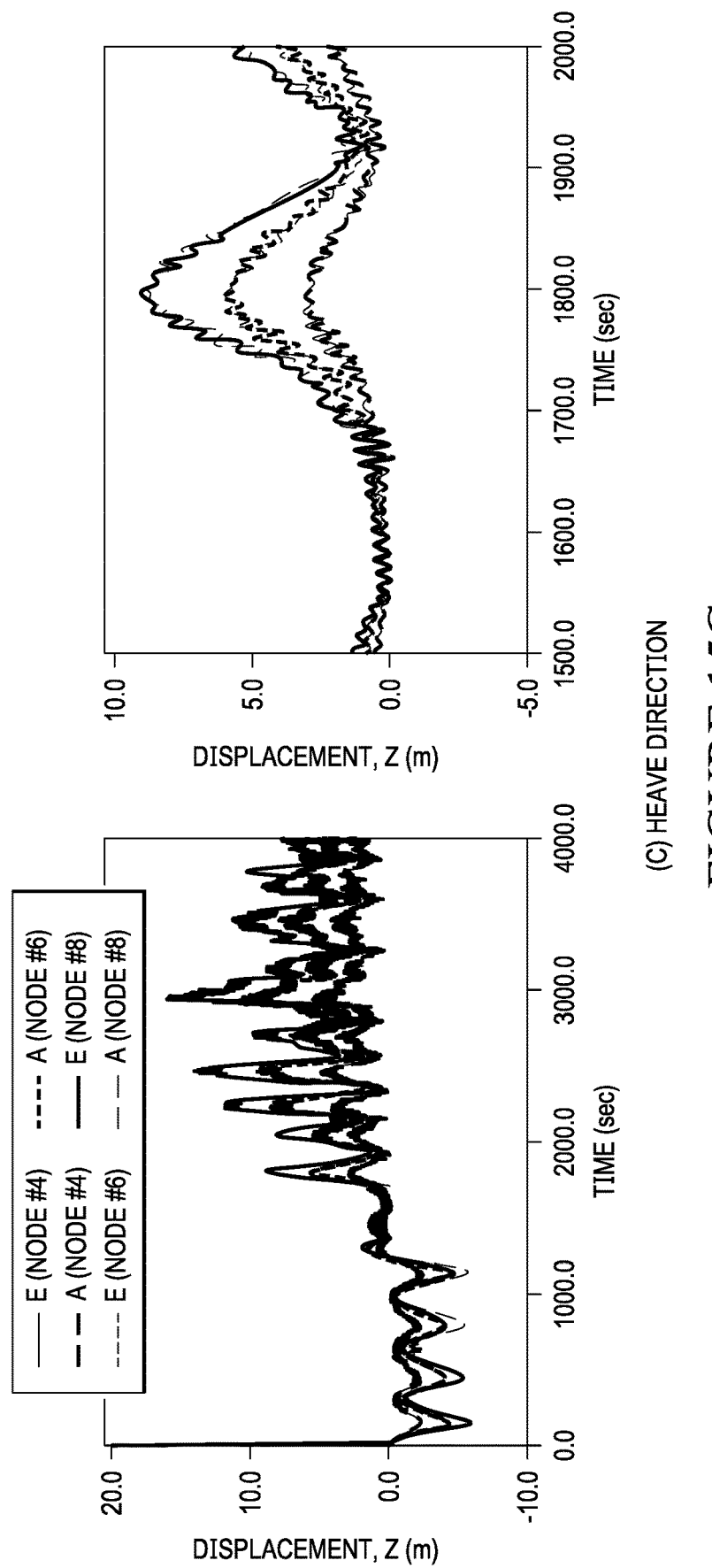
Figure 16A:
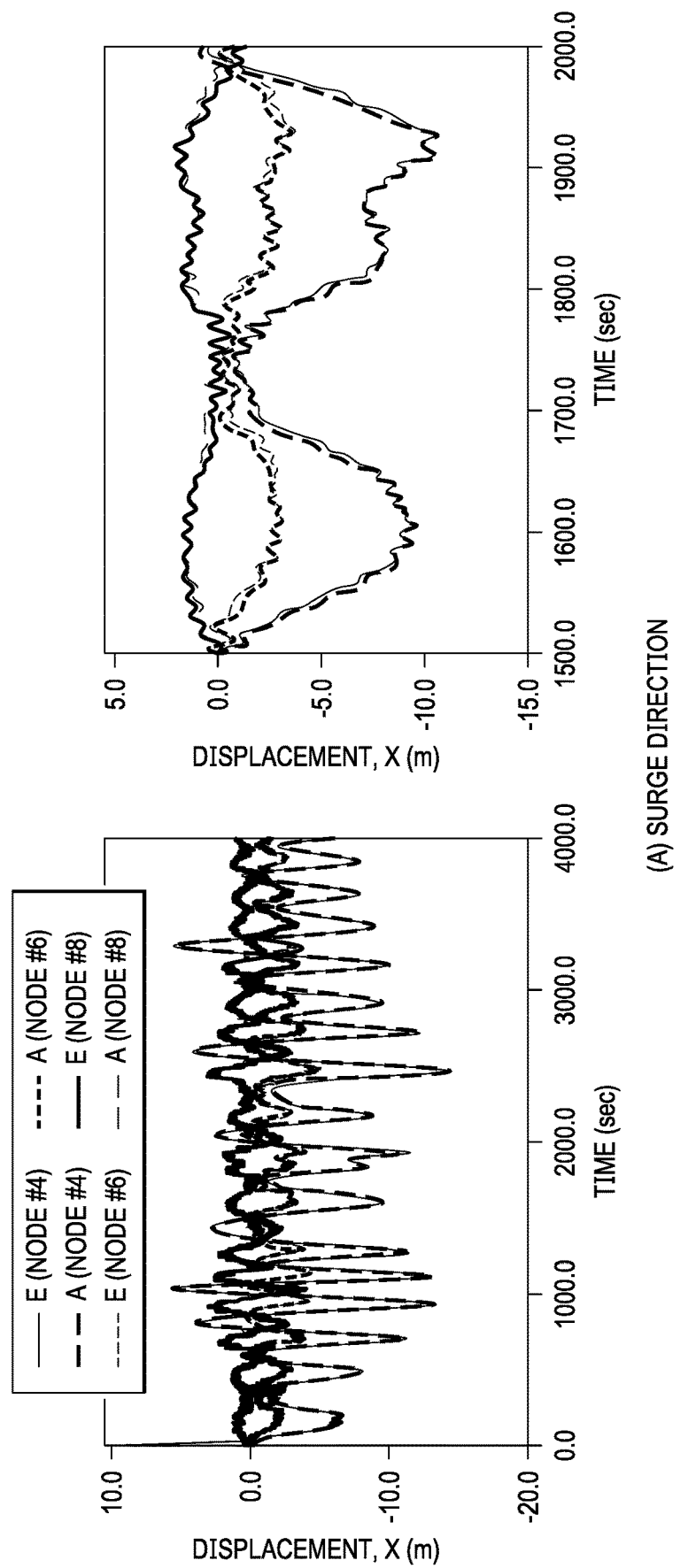
Figure 16B:
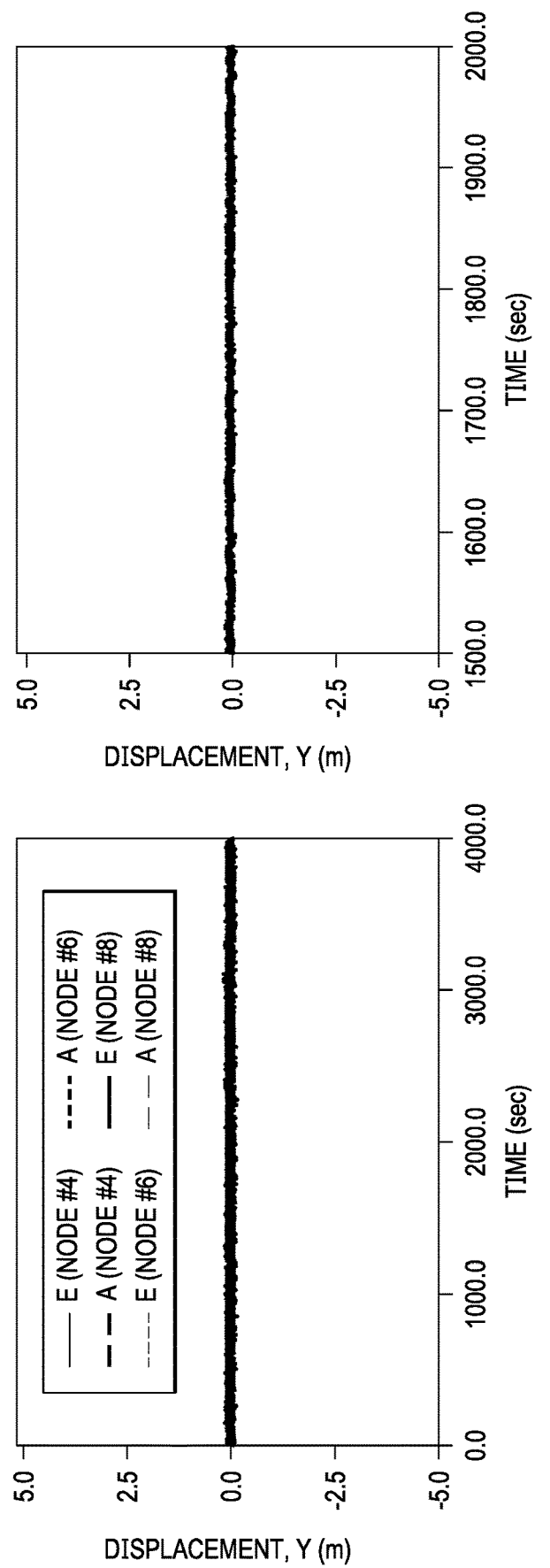
Figure 16C:
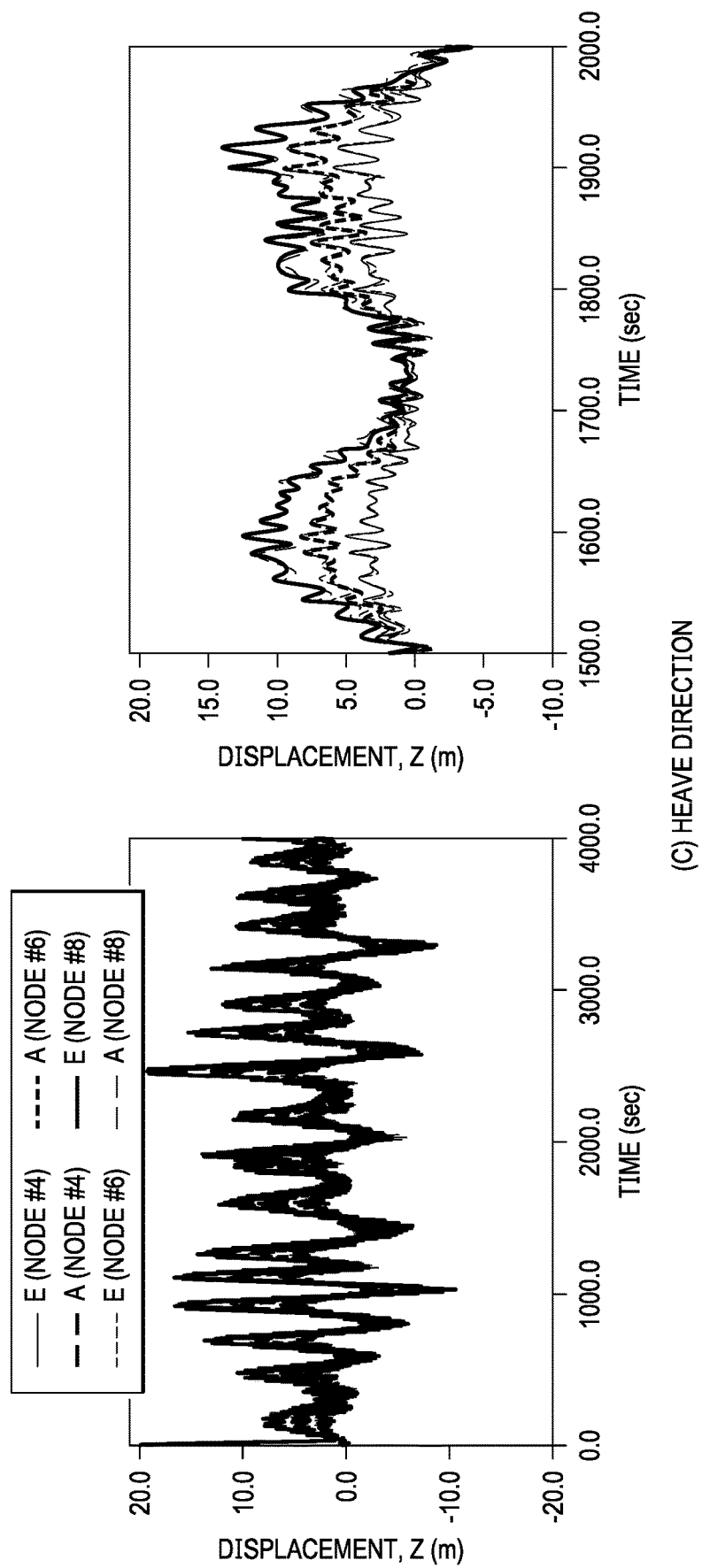
Figure 17A:
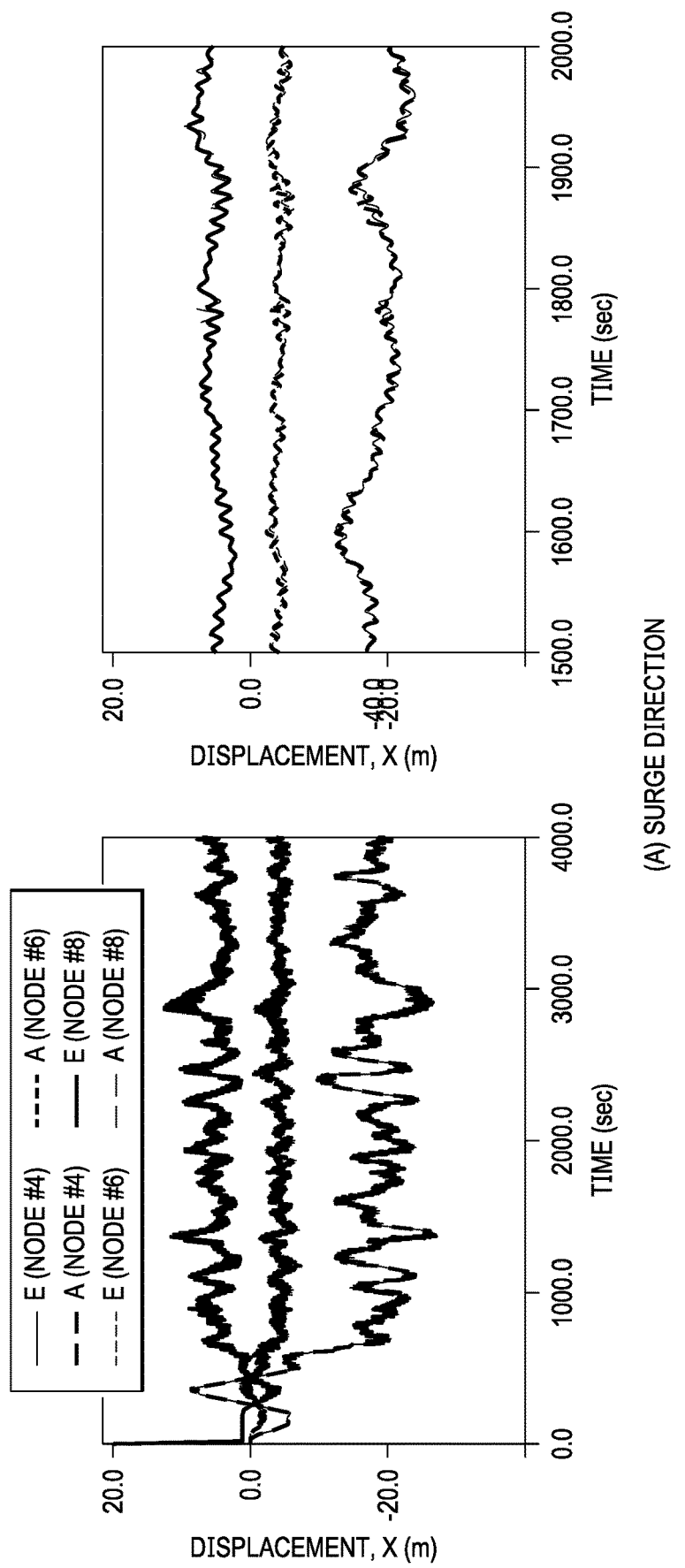
Figure 17B:
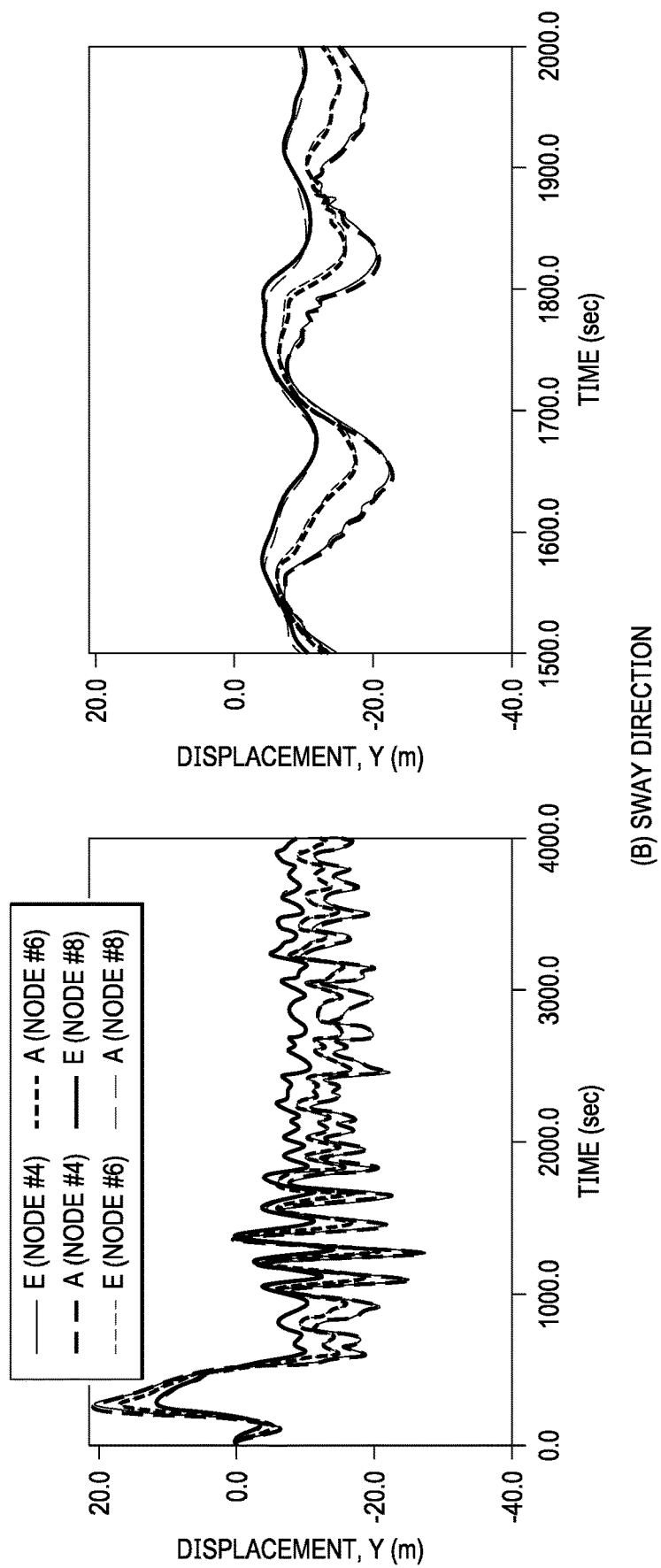
Figure 17C:
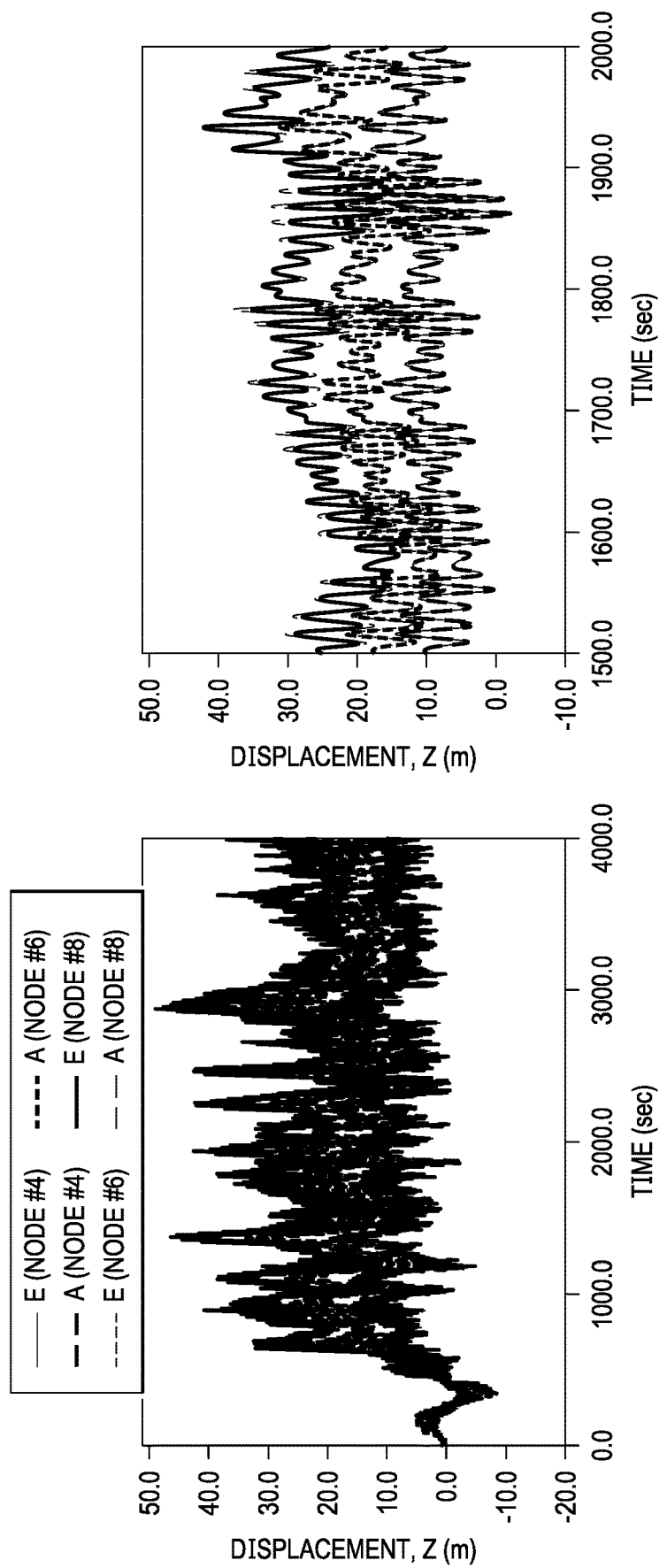

Turning now to FIGS. 13A and 13B, illustrated are graphical representations of estimated deformed shapes of a riser at 335 seconds under the environmental condition of Case 4 (TABLE 7). In FIG. 13A, the dotted line 1310 represents the initial riser shape and the dashed line 1320 represents the actual riser shape. The solid line 1330 represents estimated riser shape. The solid line 1330 connecting the estimated nodes in real-time is the estimated deformed shape. The estimated deformed shape is well matched with the actual one. The results show that the proposed method is robust and feasible to monitor the global behavior of the riser in real time. FIG. 13A illustrates the corresponding results of simulation of Case 4 at 902 seconds. The dotted line 1350 represents the initial riser shape and the dashed line 1320 represents the actual riser shape. The solid line 1330 represents estimated riser shape. Again, the results show that the proposed method is robust and feasible to monitor the global behavior of the riser in real time.

Turning now to FIGS. 14-17, illustrated are graphical representations of time histories of the actual and estimated riser responses under four different environmental conditions of Case 1 to 4 (see TABLE 7). FIGS. 14A, 14B and 14C illustrate graphical representations of surge (A), sway (B) and heave (C) displacements of nodes, respectively, for Case 1. FIGS. 15A, 15B and 15C illustrate graphical representations of surge (A), sway (B) and heave (C) displacements of nodes, respectively, for Case 2. FIGS. 16A, 16B and 16C illustrate graphical representations of surge (A), sway (B) and heave (C) displacements of nodes, respectively, for Case 3. FIGS. 17A, 17B and 17C illustrate graphical representations of surge (A), sway (B) and heave (C) displacements of nodes, respectively, for Case 4.

Cases 1 and 3 are for collinear wave-current condition and Cases 2 and 4 are for non-collinear condition. The non-collinear cases were introduced to observe more pronounced heading angle movement of the riser to prove 3D extension. Nodes 4, 6 and 8 were selected for comparison because those are far from the known two ends, i.e., nodes 1 and 11. In all cases, the estimated riser displacements are in good agreement with the actual values. The method can capture both slowly varying and wave-frequency responses of the riser. Both responses are caused by the corresponding FPSO surge motions in random waves. On the other hand, as well known, heave motions have principally only wave-frequency oscillations. It is much more difficult to recover this kind of detailed riser response using a conventional accelerometer. Also, an accelerometer-based monitoring method can be problematic due to dual-time integration and sensor noises. (See, e.g., Choi J, Kim J M-H, "Development of a New Methodology for Riser Deformed Shape Prediction/Monitoring," ASME 2018 37th International Conference on Ocean, Offshore and ArcticEngineering: American Society of Mechanical Engineers Digital Collection; 2018, which is incorporated herein by reference.) However, by using the method introduced herein, high-frequency sensor errors do not cause any problem.

Other conventional methods for riser monitoring require additional analysis models in angle data. Using stress estimations calculated from the monitored riser geometry in real-time as described herein, it is expected that the real-time cumulative fatigue damage can also be calculated. This means that more accurate fatigue life predictions can be made based on actual riser-response records using the novel method.

Figure 18:
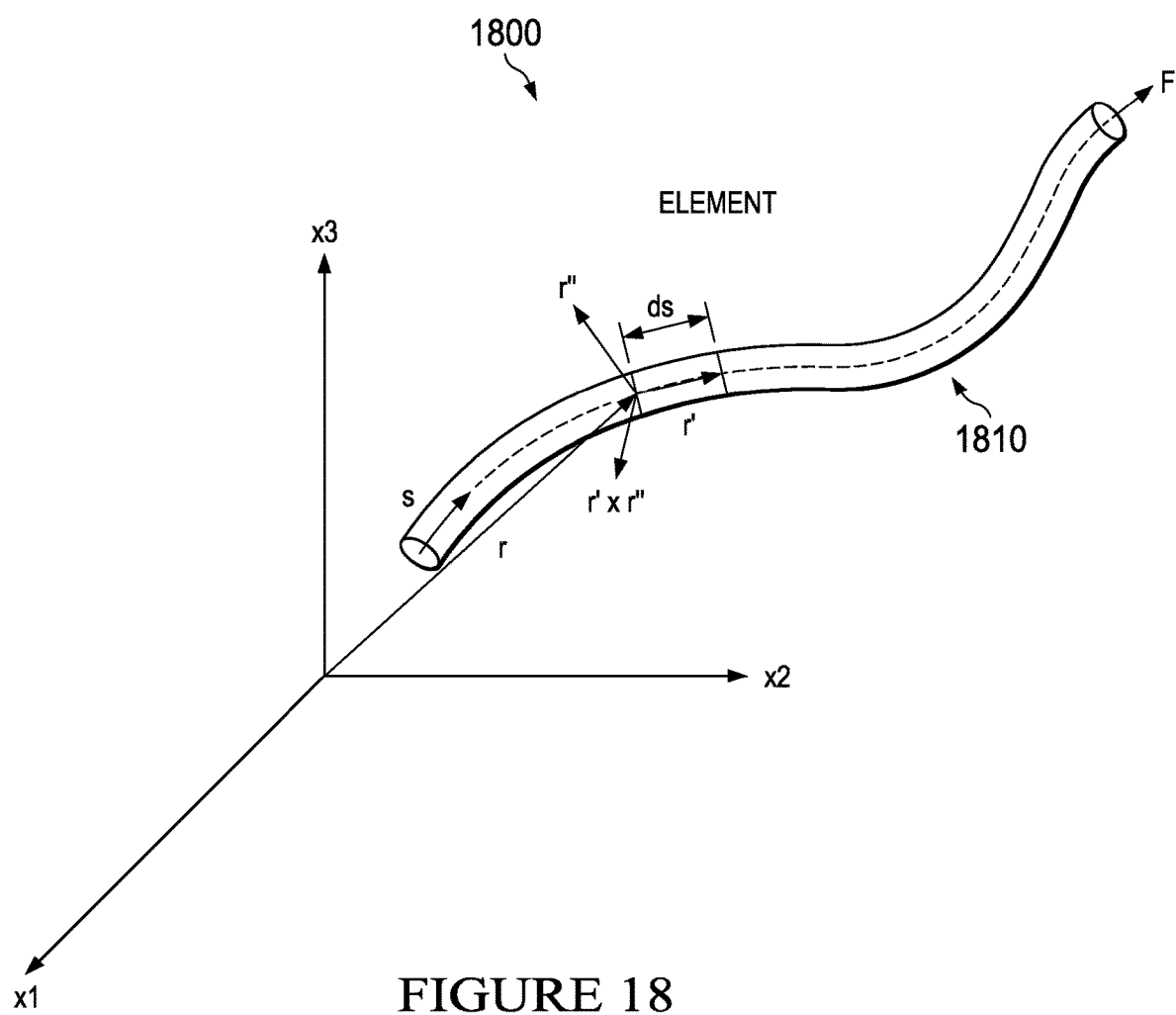
FIG. 18 illustrates a graphical representation of an embodiment of a stress estimation of a riser.

Turning now to FIG. 18, illustrated is a graphical representation of an embodiment of a stress estimation of a riser. Real-time internal stress estimation of the riser is important in view of structural safety, accumulated fatigue-damage prediction, and life extension. Axial and bending stresses are estimated after the riser's deformed shape at each time step is obtained. Either forces/moments at each element or angles/curvatures in 3D should be known to estimate these stresses. The former is almost impossible since it is challenging to measure forces and moments underwater. However, the latter is possible by calculating angles and curvatures from the monitored profile through spatial derivatives. Direct use of inclination and heading signals from sensors can have limitations since that have anti-frequency sensor errors. Signal processing can remove the sensor error; however, it can cause the phase change and distortion of time-history signals. Note that stress estimation is based on a single global coordinate system with the generalized coordinate system (see FIG. 18). The coordinate system generally has the longitudinal axis parallel to the riser's direction. FIG. 18 illustrates an element ds of a portion of a riser 1810, illustrating its inherent flexibility, in an x1-x2-x3 rectangular coordinate system 1800. The riser 1810 experiences a force F parallel to a portion of the riser 1810.

The effective tension and bending moments for the riser can be calculated. (See, e.g., Ran Z, Kim M, Zheng W, "Coupled dynamic analysis of a moored spar in random waves and currents (time-domain versus frequency-domain analysis)," Journal of Offshore Mechanics and Arctic Engineering, 121 (1999) 194-200, which is incorporated herein by reference.)

$$T_e = T_w + (P_o A_o - P_i A_i) \qquad (18)$$

$$T_w = \frac{E(A_o - A_i)}{L}\Delta L - 2v(P_o A_o - P_i A_i)$$

$$M_{opb} = EI r_Z''$$

$$M_{ipb} = EI r_Y''$$

where and $T_e$ and $T_w$ are the effective and wall tensions, P and A are pressure and cross-sectional area, L is an element length, $\Delta L$ means an extension of the element, v is Poisson's ratio, M is bending moment, E is Young's modulus, I is the area moment of inertia, and $$r''(=r_x''\vec{i}+r_y''\vec{j}+r_z''\vec{k})$$

represents the principal normal vectors, which can be obtained by the spatial derivatives of position vector r twice. Subscripts, o, i, opb, and ipb denote outer, inner, direction for out-of-plane bending, and in-plane bending, respectively.

According to Equation 18, tension estimation requires an actual extension of a riser pipe. Since a small extension can change the tension significantly, the direct calculation from strain variation is infeasible. Therefore, another equation is introduced to calculate the riser effective tension as follows:

$$T_{e,i+1} = T_{e,i} + (W_{water,i} - W_{riser,i} - W_{fluid,i})|\gamma_i| - m_r \ddot{r}_i^n \qquad (12)$$

$$\gamma_i = \frac{r_{s,i}}{\sqrt{r_{s,i}^2 + r_{y,i}^2 + r_{s,i}^2}}$$

where i is an element number, and $W_{water}$, $W_{riser}$, and $W_{fluid}$ are weights of water, riser, and fluid. The parameter $\gamma$ is a directional cosign in the z-direction. The element number i starts from the element close to the fairlead location. According to Equation 19, as the effective tension at the fairlead position is measured, effective tension at each element can be successively calculated.

As indicated in Equation 18, out-of-plane and in-plane bending moments are a function of the corresponding principal normal vectors, which are correlated to the curvature. After solving tensions in bending moments, the governing cyclic nominal stress component can be obtained as follows:

$$\sigma_{total}(t) = \sigma_T(t) + \sigma_{BM}(\theta, t) \qquad (20)$$

$$\sigma_T(t) = \frac{T_e(t)}{\pi(D - t_a)t_a}$$

$$\sigma_{BM}(\theta, t) = (M_{opb}(t)\cos(\theta) + M_{ipb}(t)\sin(\theta))\left(\frac{D - t_a}{2I}\right)$$

where $\sigma_T(t)$ and $\sigma_{BM}(\Theta, t)$ are axial and bending stresses, $t_a = t_p - 0.5 t_{corr}$ with pipe wall thickness $t_p$, and the corrosion allowance $t_{corr}$, and where D is the outer diameter. Corrosion allowance is not considered, without limitation, in the current estimation.

Figure 19:
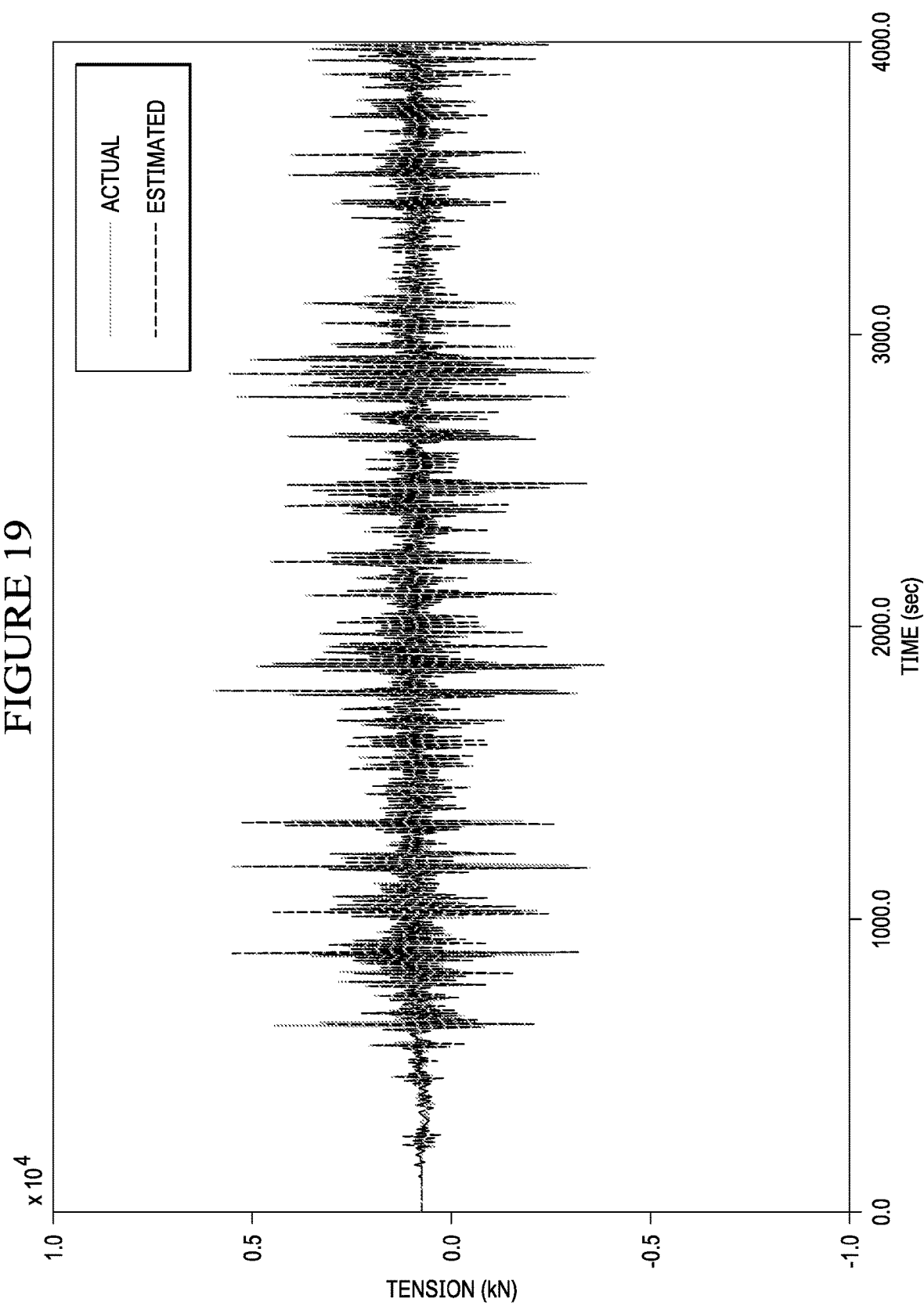
FIGS. 19 and 20 illustrate graphical representations of time-history comparisons of riser's effective tension (FIG. 19) as well as out of plane (a) and in-plane (b) bending moments (FIG. 20) at an arc length of 550 meters for the most extreme environment (Case 4, TABLE 7)
Figure 20:
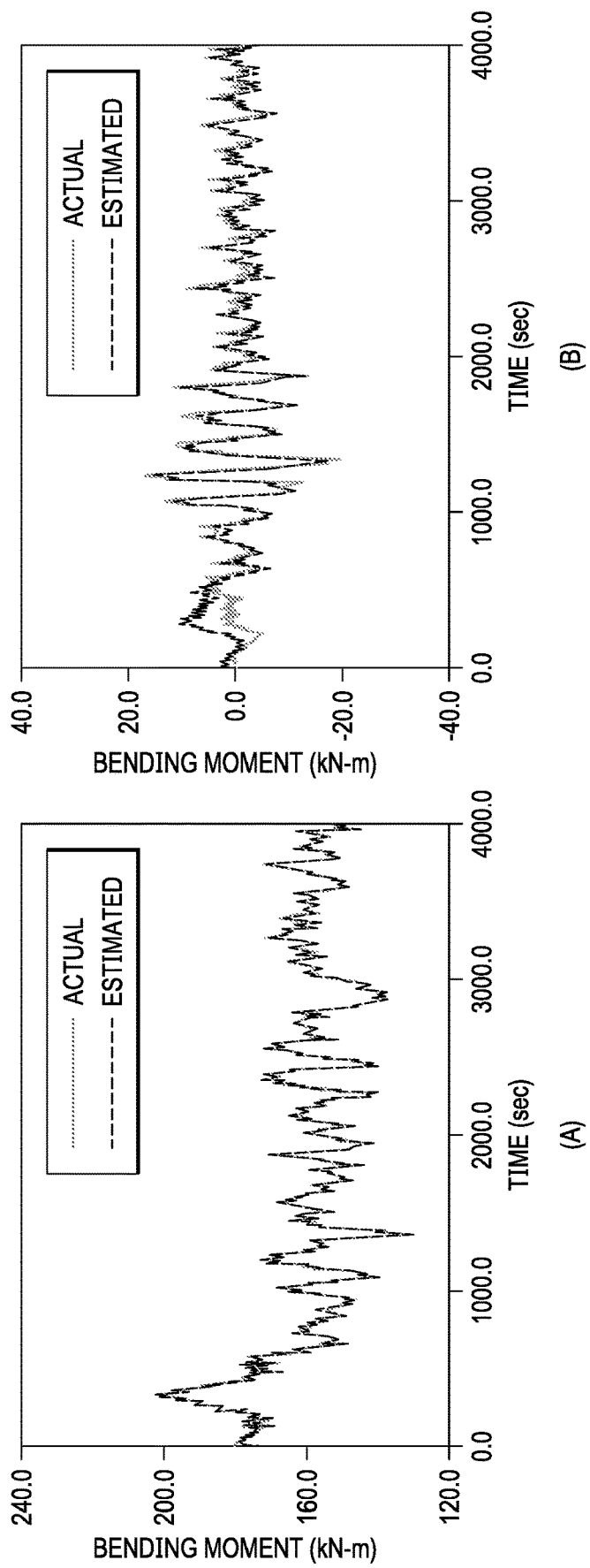

Turning now to FIGS. 19 and 20, illustrated are graphical representations of time-history comparisons of riser's effective tension (FIG. 19) as well as out of plane (a) and in-plane (b) bending moments (FIG. 20) at an arc length of 550 meters for the most extreme environment (Case 4, TABLE 7). It is shown that the estimated tension and moments agree well with the actual values. The proposed tension-estimation method works well under the condition that the top tension is measured by tension-gage. Also, based on the estimated shape, the predicted bending moments in two directions compare well with the actual input values after the initial adjusting stage of Kalman filter.

Figure 21:
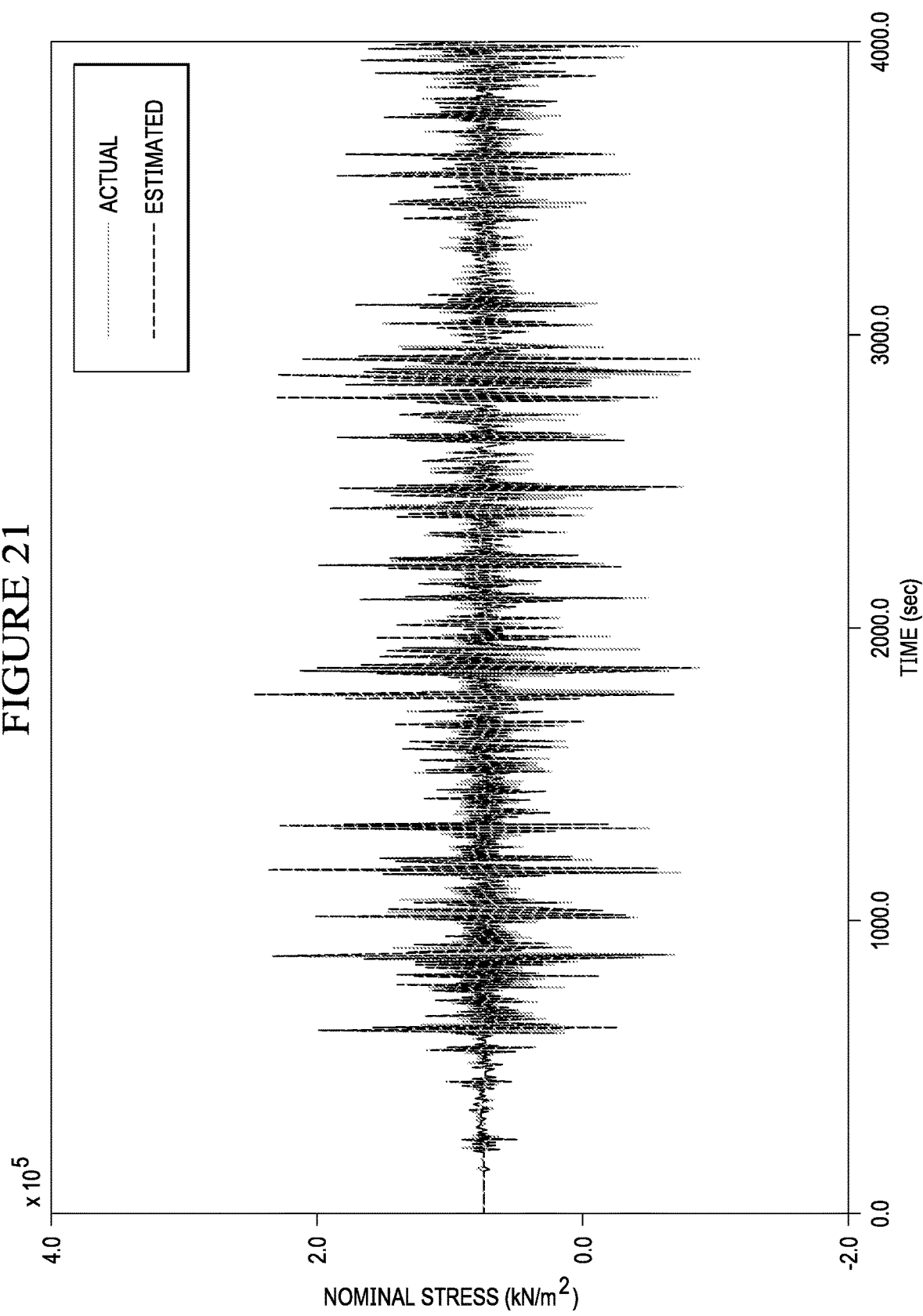
FIG. 21 illustrates a graphical representation of the combined nominal stress at an arc length of 550 meters, and θ is set as zero degrees where the maximum normal stress occurs.

Turning now to FIG. 21, illustrated is a graphical representation of the combined nominal stress at an arc length of 550 meters, and θ is set as zero degrees where the maximum normal stress occurs. The predicted stress matches well with the actual value from the time-domain simulation. The capability also proves that the stress monitoring from the riser's deformed shape in real time is feasible. Furthermore, the capability of real-time stress estimation near hotspots also allows the real-time estimation of the accumulated fatigue damage so that it can be used for the assessment of life extension. (See, e.g., Kim S, Kim M-H, "Dynamic behaviors of conventional SCR and lazy-wave SCR for FPSOs in deepwater," Ocean Engineering, 106 (2015) 396-414, and Kim S, Kim M-H, "Effects of geometric shape of LWSCR (lazy-wave steel catenary riser) onits global performance and structural behavior," Ocean Systems Engineering, 8 (2018) 247-279, which are incorporated herein by reference.)

Figure 22:
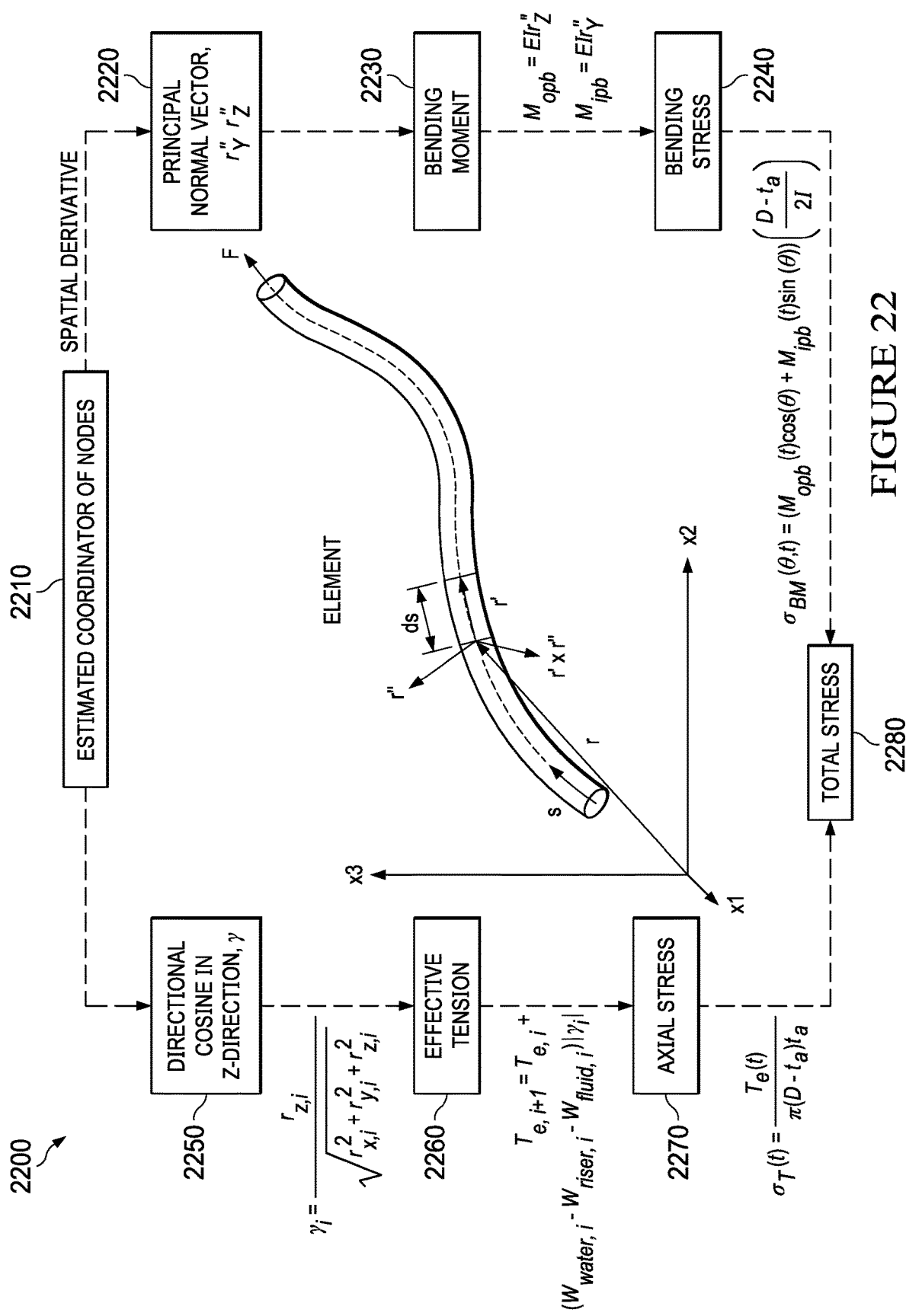
FIG. 22 illustrates a block diagram of an embodiment of a method for riser shape estimation.

Turning now to FIG. 22, illustrated is a block diagram of an embodiment of a method 2200 for riser shape estimation. At a step or module 2210, estimated coordinates are computed at nodes. At a step or module 2220, principal normal vectors to the riser are calculated. At a step or module 2230, bending moment of the riser is calculated. At a step or module 2240, bending stress is calculated. The result produces a total stress on the riser at a step or module 2280. Continuing on the left portion of the drawing, after computing estimated coordinates at nodes at the step or module 2210, a directional cosine in the z direction is calculated at a step or module 2250. At a step or module 2260, effective tension in the riser is calculated. At a step or module 2270, axial stress on the riser is calculated. And again, At a step or module 2280, the total stress on the riser is calculated.

Figure 23:
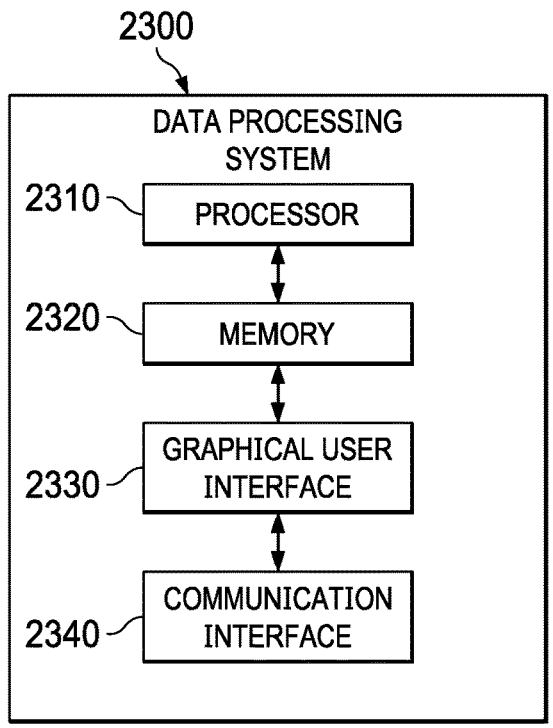
FIG. 23 illustrates a block diagram of an embodiment of a data processing system forming a portion of an apparatus.

Turning now to FIG. 23, illustrated is a block diagram of an embodiment of a data processing system 2300 forming a portion of an apparatus. The data processing system 2300 may execute example machine-readable instructions to implement at least a portion of one or more of the methods and/or processes described herein, and/or to implement a portion of one or more of the example apparatus for estimating a deformed shape of a structure such as a riser coupled between a platform and a seabed as described herein. The data processing system 2300 may be or include, for example, one or more processors, controllers, special-purpose computing devices, servers, personal computers, personal digital assistant ("PDA") devices, smartphones, internet appliances, and/or other types of computing devices. Moreover, the data processing system 2300 shown in FIG. 23 is implemented for the apparatus for estimating a deformed shape and a stress of a riser (segment) and one or more components or functions of the data processing system 2300 may be implemented, without limitation, in a laptop computer, or tablet. The data processing system 2300 includes a processor 2310 such as, for example, a general-purpose programmable processor. The processors may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The data processing system 2300 also includes memory 2320, which may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memory 2320 may include program instructions or computer program code that, when executed by an associated processor, enable the respective apparatus to perform its intended tasks. Of course, the memory 2320 may form a data buffer for data transmitted to and from the same. Exemplary embodiments of the system, subsystems, and modules as described herein may be implemented, at least in part, by computer software executable by processors, or by hardware, or by combinations thereof.

The data processing system 2300 may also include a graphical user interface 2330. The graphical user interface 2330 may include or be implemented by various types of standard interfaces, such as an Ethernet interface, a universal serial bus ("USB"), a wireless interface, and/or a cellular interface, among others. The graphical user interface 2330 may also include a graphics driver card. The graphical user interface 2330 may also include one or more input devices to permit a user to enter data and commands into the processor 2310. The graphical interface circuit 2330 may be, include, or be implemented by, for example, a keyboard, a mouse, a touchscreen, a track-pad, a trackball, an isopoint, and/or a voice recognition system, among others.

The data processing system 2300 may further include a communication interface 2340 to provide remote communication capabilities. The communication interface 2340 may a modem or network interface card to facilitate exchange of data with external computing devices via a network (e.g., Ethernet connection, digital subscriber line ("DSL"), telephone line, coaxial cable, cellular telephone system, satellite, etc.).

Thus, the modules and/or other components of the data processing system 2300 may be implemented in accordance with hardware (embodied in one or more chips including an integrated circuit such as an application specific integrated circuit), or may be implemented as software or firmware for execution by a processor. In particular, in the case of firmware or software, the embodiment can be provided as a computer program product including a computer readable medium or storage structure embodying computer program code (i.e., software or firmware) thereon for execution by the processor.

Figure 24:
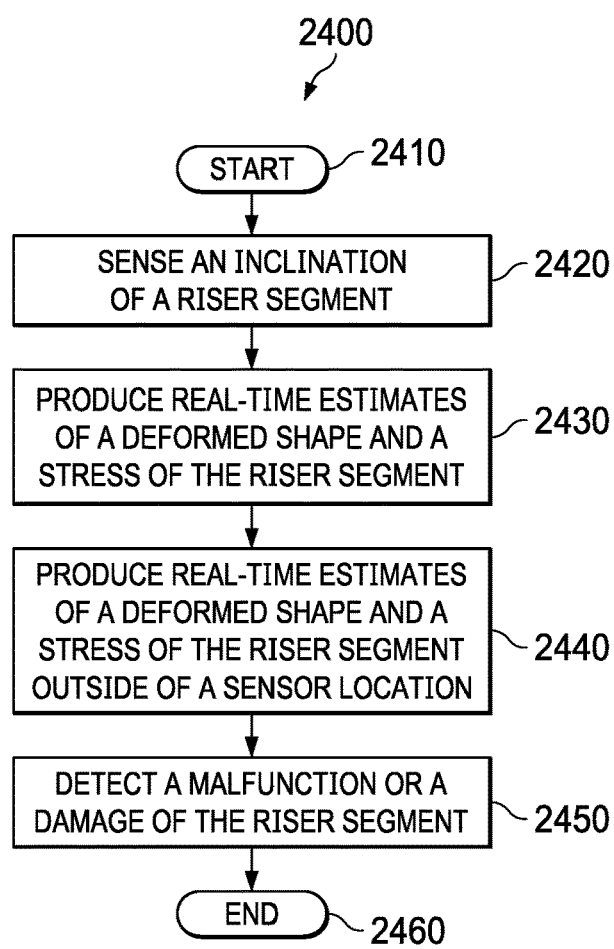
FIG. 24 illustrates a flow diagram of a method operable with a riser having an upper end coupled to a platform and a lower end coupled to a seabed.

Turning now to FIG. 24, illustrated is a flow diagram of a method 2400 operable with a riser having an upper end coupled to a platform and a lower end coupled to a seabed (e.g., at an anchoring point in the seabed). The method 2400 begins at a start step or module 2410, then at a step or module 2420, the method 2400 senses an inclination of a riser segment between riser nodes of the riser between the upper end and the lower end with, for instance, sensors. At a start step or module 2430, the method 2400 produces real-time estimates of a deformed shape and a stress of the riser segment using the sensed inclination between the riser nodes with a Kalman filter algorithm executing, for instance, on a data processing system.

The Kalman filter algorithm reduces a sensor error and a prediction error of the real-time estimates of the deformed shape and the stress of the riser segment by a recursive calculation process. The upper end and the lower end of the riser are known at time steps of execution of the Kalman filter algorithm. The deformed shape and the stress of the riser segment are induced by environmental loadings and motions of the platform. The shape of the riser may be estimated using measured signals from multiple bi-axial inclinometers positioned along the riser.

The Kalman filter algorithm may be an extended Kalman filter algorithm. The extended Kalman filter algorithm is a nonlinear version of a Kalman filter constructed by linearization of a nonlinear function. The extended Kalman filter algorithm employs a measured vertical inclination and a measured azimuth of the riser segment to produce the estimates of the deformed shape and the stress of the riser segment. The extended Kalman filter algorithm reproduces actual riser profiles at each of a plurality of time steps of the extended Kalman filter and is robust against sensor noises.

At a step or module 2440, the method 2400 produces real-time estimates of the deformed shape and the stress of the riser in a portion outside of a sensor location with a machine-learning algorithm executing, for instance, on the data processing system. The method 2400 detects a malfunction or a damage of the riser segment at a step or module 2450. A global navigation satellite system may be employed to estimate a position of the upper end of the riser. The method 2400 concludes at an end step or module 2460.

Thus, a real-time riser monitoring process and method based on the (extended) Kalman filter has been introduced herein. A riser's deformed shape induced by environmental loadings and platform motions is monitored in real-time. Algorithms to estimate corresponding bending, tension and axial stresses along the riser can be estimated from the obtained riser shape. The technique is distinguished from a purely deterministic method for riser shape identification in which no sensor error is assumed on the states, which is an advantage of a Kalman filter. Not only riser fatigue but also abnormal motion can be detected in real-time.

The system and method estimates the overall shape of riser in real-time using the measured signals from multiple bi-axial (inclination and heading) inclinometers along the riser. Another data needed was the positions of two end points. Then, the extended Kalman filter ("EKF") algorithm provides the real-time estimates with the instantaneous riser profile by using the sensor signals. The relationship between the riser position and measured angles for each segment may be nonlinear, so equivalent-linearization was done by using Jacobian matrix. Then, the combined matrix for the whole elements was simultaneously processed through the developed EKF algorithm. As a result, the riser's deformed shape induced by environmental loadings and platform motions can be monitored in real-time. Subsequent algorithms were also developed so that the corresponding bending and axial stresses along the riser could also be estimated from the obtained riser shape, which can further result in the real-time estimation of fatigue-damage accumulation.

To validate the method, a turret-moored FPSO with a SCR was chosen, and the platform-mooring-riser-coupled time-domain simulation was conducted under different environmental-loading conditions. The artificial white noise was added to numerical sensor signals to make the signal close to the real situation. The EKF algorithm was applied and shown to continuously reproduce the actual instantaneous riser profile and stress in real time.

Four different loading conditions were investigated and the developed algorithms successfully reproduced the actual values in all cases. The developed algorithms were shown to be robust against artificial sensor noises, while conventional accelerometer-based algorithms are in many cases vulnerable to the errors associated with dual-time integration with sensor noises. The successive axial and bending stresses were also satisfactorily reproduced compared to the actual values. In conclusion, the developed extended Kalman filter technique is robust and useful for practical applications.

The techniques shown in the FIGS. illustrated herein can be implemented using code and data stored and executed on one or more apparatus. Such apparatus store and communicate (internally and/or with other communication devices over a network) code and data using non-transitory tangible machine readable medium (e.g., magnetic disks; optical disks; read only memory; flash memory devices; phase-change memory) and transitory machine-readable communication medium (e.g., electrical, optical, acoustical or other forms of propagated signals-such as carrier waves, infrared signals, digital signals, etc.). In addition, such apparatus typically include a set of one or more processors coupled with one or more other components, such as memory, one or more input/output devices (e.g., keyboard, a touchscreen, and/or a display), and a network connection. The coupling of the set of processors and other components is typically through one or more busses or bridges (also termed bus controllers). The memory and signals carrying the network traffic respectively represent one or more non-transitory tangible machine readable medium and transitory machine-readable communication medium. Thus, the memory of a given apparatus typically stores code and/or data for execution on the set of one or more processors thereof. Of course, one or more parts of an embodiment of the invention may be implemented using different combination of software, firmware, and/or hardware. For example, the techniques shown in the FIGS. have been described with reference to a specific entity performing the techniques. One of skill in the art would recognize that in other embodiments other or different entities may perform the same techniques. Further entities shown as separate may be combined as one entity in other embodiments without changing the fundamental teachings of the techniques.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof. Also, many of the features, functions, and steps of operating the same may be reordered, omitted, added, etc., and still fall within the broad scope of the various embodiments.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system operable with a riser having an upper end coupled to a platform and a lower end coupled to a seabed, wherein said riser comprises a plurality of riser segments collectively interconnected by a plurality of nodes each joining a corresponding pair of said riser segment, said system comprising:

sensors including bi-axial inclinometers each positioned in a middle of a corresponding one of a subset of said riser segments and configured to sense and output a signal indicative of vertical inclination and azimuthal heading measurements at said middle of said corresponding riser segment in real-time; and a data processing system configured to employ a nonlinear "extended" Kalman filter ("EKF") algorithm to produce real-time estimates of a deformed shape and a stress of said riser, and of each individual riser segment, using known locations of said upper and lower ends and said vertical inclination and azimuthal heading measurements by reproducing a profile of each riser segment at each of a plurality of time steps, wherein:

said EKF algorithm reduces a sensor error and a prediction error of the real-time estimates of said deformed shape and said stress of each riser segment via a recursive calculation process;

said EKF algorithm produces said real-time estimates of each riser segment, in a portion outside of a location of said corresponding bi-axial inclinometer, via a machine-learning algorithm executing on said data processing system;

said data processing system is further configured to estimate bending, tension, and axial stresses of said riser segments based on said estimated deformed shape of said riser and said riser segments; and said data processing system is further configured to detect malfunctions, damages, and accumulated fatigue of said riser segments using said real-time estimates of said deformed shape and said stresses of said riser segments.

2. The system as recited in claim 1 wherein said Kalman filter algorithm reduces a sensor error and a prediction error of said real-time estimates of said deformed shape and said stress of said riser segments by a recursive calculation process.

3. The system as recited in claim 1 wherein said deformed shape and said stress of said riser segments are induced by environmental loadings and motions of said platform.

4. The system as recited in claim 1 wherein a global navigation satellite system is employed to determine said known location of said upper end of said riser.

5. The system as recited in claim 1 wherein said real-time estimates of said deformed shape and said stress of said riser segments comprise abnormal motion along said riser.

6. A method operable with a riser having an upper end coupled to a platform and a lower end coupled to a seabed, wherein said riser comprises a plurality of riser segments collectively interconnected by a plurality of nodes each joining a corresponding pair of said riser segment, said method comprising:

sensing vertical inclination and azimuthal heading measurements at a middle of each of a subset of said riser segments in real-time with sensors including bi-axial inclinometers each positioned in the middle of the corresponding one of said subset of riser segments; and operating a data processing system to:

employ a nonlinear "extended" Kalman filter ("EKF") algorithm to produce real-time estimates of a deformed shape and a stress of said riser, and of each individual riser segment, segments using known locations of said upper and lower ends and said vertical inclination and azimuthal heading measurements by reproducing a profile of each riser segment at each of a plurality of time steps, wherein:

said EKF algorithm reduces a sensor error and a prediction error of the real-time estimates of said deformed shape and said stress of each riser segment via a recursive calculation process;

said EKF algorithm produces said real-time estimates of each riser segment, in a portion outside of a location of said corresponding bi-axial inclinometer, via a machine-learning algorithm executing on said data processing system; and said data processing system is further configured to estimate bending, tension, and axial stresses of said riser segments based on said estimated deformed shape of said riser and said riser segments; and detect malfunctions, damages, and accumulated fatigue of said riser segments using said real-time estimates of said deformed shape and said stresses of said riser segments.

7. The method as recited in claim 6 wherein said Kalman filter algorithm reduces a sensor error and a prediction error of said real-time estimates of said deformed shape and said stress of said riser segments by a recursive calculation process.

8. The method as recited in claim 6 wherein a global navigation satellite system is employed to determine said known location of said upper end of said riser.

9. The method as recited in claim 6 wherein said real-time estimates of said deformed shape and said stress of said riser segments comprise abnormal motion along said riser.

10. The system of claim 1 wherein:

the EKF algorithm establishes a relationship between a measurement state vector and an estimated state vector;

said measurement state vector contains said vertical inclination and azimuthal heading measurements at a corresponding one of said time steps; and said estimated state vector contains x and y coordinates of each node at said corresponding one of said time steps.

11. The system of claim 10 wherein said EKF algorithm determines said estimated state vector corresponding to each time step based on:

a Kalman gain determined for said corresponding time step;

a measurement vector containing said vertical inclination and azimuthal heading measurements for said corresponding time step; and a previously predicted state vector containing x and y coordinates of each node at an earlier one of said time steps.

12. The system of claim 11 wherein said Kalman gain utilized at each time step is based on:

an error covariance matrix determined for the current time step;

a measurement error covariance matrix determined for the current time step; and an error covariance matrix determined for a previous time step.

13. The system of claim 12 wherein said error covariance matrix utilized at each time step is based on:

said Kalman gain determined for that step; and said error covariance matrix determined for said previous time step.

14. The system of claim 11 wherein said EKF algorithm repeats said state vector at each time step until a predetermined convergence is achieved.

15. The system of claim 1 wherein:

said Kalman filter algorithm reduces a sensor error and a prediction error of said real-time estimates of said deformed shape and said stress of said riser segments by a recursive calculation process;

said deformed shape and said stress of said riser segments are induced by environmental loadings and motions of said platform;

a global navigation satellite system is employed to determine said known location of said upper end of said riser;

said real-time estimates of said deformed shape and said stress of said riser segments comprise abnormal motion along said riser;

the EKF algorithm establishes a relationship between a measurement state vector and an estimated state vector;

said measurement state vector contains said vertical inclination and azimuthal heading measurements at a corresponding one of said time steps;

said estimated state vector contains x and y coordinates of each node at said corresponding one of said time steps;

said EKF algorithm determines said estimated state vector corresponding to each time step based on:
 a Kalman gain determined for said corresponding time step;
 a measurement vector containing said vertical inclination and azimuthal heading measurements for said corresponding time step; and
 a previously predicted state vector containing x and y coordinates of each node at an earlier one of said time steps;

said Kalman gain utilized at each time step is based on:
 an error covariance matrix determined for the current time step;
 a measurement error covariance matrix determined for the current time step; and
 an error covariance matrix determined for a previous time step;

said error covariance matrix utilized at each time step is based on:
 said Kalman gain determined for that step; and
 said error covariance matrix determined for said previous time step; and said EKF algorithm repeats said state vector at each time step until a predetermined convergence is achieved.

16. The method of claim 6 wherein:
the EKF algorithm establishes a relationship between a measurement state vector and an estimated state vector;
said measurement state vector contains said vertical inclination and azimuthal heading measurements at a corresponding one of said time steps; and
said estimated state vector contains x and y coordinates of each node at said corresponding one of said time steps.

17. The method of claim 16 wherein said EKF algorithm determines said estimated state vector corresponding to each time step based on:
 a Kalman gain determined for said corresponding time step;
 a measurement vector containing said vertical inclination and azimuthal heading measurements for said corresponding time step; and
 a previously predicted state vector containing x and y coordinates of each node at an earlier one of said time steps.

18. The method of claim 17 wherein said Kalman gain utilized at each time step is based on:
 an error covariance matrix determined for the current time step;
 a measurement error covariance matrix determined for the current time step; and
 an error covariance matrix determined for a previous time step.

19. The method of claim 18 wherein said error covariance matrix utilized at each time step is based on:
 said Kalman gain determined for that step; and
 said error covariance matrix determined for said previous time step.

20. The method of claim 17 wherein said EKF algorithm repeats said state vector at each time step until a predetermined convergence is achieved.

* * * * *